US007078679B2

(12) United States Patent
Westphall et al.

(10) Patent No.: US 7,078,679 B2
(45) Date of Patent: Jul. 18, 2006

(54) INDUCTIVE DETECTION FOR MASS SPECTROMETRY

(75) Inventors: Michael S. Westphall, Fitchburg, WI (US); Lloyd M. Smith, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 2 days.

(21) Appl. No.: 10/723,462

(22) Filed: Nov. 26, 2003

(65) Prior Publication Data

US 2004/0169137 A1 Sep. 2, 2004

Related U.S. Application Data

(60) Provisional application No. 60/429,844, filed on Nov. 27, 2002.

(51) Int. Cl.
*B01D 59/44* (2006.01)
*H01J 49/00* (2006.01)

(52) U.S. Cl. ....................................... 250/287; 250/288

(58) Field of Classification Search ................ 250/281, 250/287, 288; 324/207.15

See application file for complete search history.

(56) References Cited

U.S. PATENT DOCUMENTS

| | | | | |
|---|---|---|---|---|
| 3,226,543 | A | 12/1965 | Melzner | 250/41.9 |
| 3,683,212 | A | 8/1972 | Zoltan | 310/8.3 |
| 3,857,049 | A | 12/1974 | Zoltan | 310/8.1 |
| 4,352,570 | A | 10/1982 | Firth | 366/127 |
| 4,357,536 | A | 11/1982 | Varma et al. | 250/397 |
| 4,461,155 | A | 7/1984 | Werjefelt | 62/93 |
| 4,492,322 | A | 1/1985 | Hieftje et al. | 222/420 |
| 4,546,253 | A | 10/1985 | Tsuchiya et al. | 250/288 |
| 4,579,279 | A | 4/1986 | Marchant | 239/3 |
| 4,580,148 | A | 4/1986 | Domoto et al. | 347/63 |
| 4,641,155 | A | 2/1987 | Zoltan | 346/140 |
| 4,735,364 | A | 4/1988 | Marchant | 239/690.1 |
| 4,845,512 | A | 7/1989 | Arway | 347/77 |

(Continued)

FOREIGN PATENT DOCUMENTS

WO WO 00/17908 3/2000

OTHER PUBLICATIONS

Inductive and capacitive sensor arrays for in situ composition sensors by Steenberg et al, Aerospace Conference, 2001, IEEE Proceedings, Mar. 10-17, 2001, vol. 1, pp.: 1/299-1/309.*

(Continued)

*Primary Examiner*—Nikita Wells
*Assistant Examiner*—Kalimah Fernandez
(74) *Attorney, Agent, or Firm*—Greenlee, Winner & Sullivan, P.C.

(57) ABSTRACT

The invention provides devices, device configurations and methods for improved sensitivity, resolution and efficiency in mass spectrometry, particularly as applied to biological molecules, including biological polymers, such as proteins and nucleic acids. More particularly, the invention provides methods and devices for analyzing and detecting electrically charged particles, especially suitable for gas phase ions generated from high molecular weight compounds. In one aspect, the invention provides devices and methods for determining the velocity, charged state or both of electrically charged particles and packets of electrically charged particles. In another aspect, the invention provides methods and devices for the time-of-flight analysis of electrically charged particles comprising spatially collimated sources. In another aspect, the invention relates to multiple detection using inductive detectors, improved methods of signal averaging and charged particle detection in coincidence.

16 Claims, 13 Drawing Sheets

U.S. PATENT DOCUMENTS

| | | | | |
|---|---|---|---|---|
| 4,924,097 | A | 5/1990 | Browner et al. | 250/343 |
| 4,935,624 | A | 6/1990 | Henion et al. | 250/288 |
| 5,073,713 | A | 12/1991 | Smith et al. | 250/282 |
| 5,076,097 | A | 12/1991 | Zarrin et al. | 73/61.1 |
| 5,192,865 | A | 3/1993 | Zhu | 250/288 |
| 5,247,842 | A | 9/1993 | Kaufman et al. | 73/865.5 |
| RE34,757 | E | 10/1994 | Smith et al. | 204/452 |
| 5,403,617 | A | 4/1995 | Haaland | 427/180 |
| 5,475,228 | A | 12/1995 | Palathingal | 250/397 |
| 5,504,327 | A | 4/1996 | Sproch et al. | 250/288 |
| 5,560,543 | A | 10/1996 | Smith et al. | 239/102.2 |
| 5,565,677 | A | 10/1996 | Wexler et al. | 250/251 |
| 5,591,969 | A * | 1/1997 | Park et al. | 250/287 |
| 5,611,846 | A | 3/1997 | Overton et al. | 96/102 |
| 5,614,711 | A | 3/1997 | Li et al. | 250/287 |
| 5,625,186 | A | 4/1997 | Frankevich et al. | 250/292 |
| 5,750,988 | A | 5/1998 | Apffel et al. | 250/288 |
| 5,767,512 | A | 6/1998 | Eiden et al. | 250/282 |
| 5,770,857 | A | 6/1998 | Fuerstenau et al. | 250/281 |
| 5,777,325 | A * | 7/1998 | Weinberger et al. | 250/287 |
| 5,873,523 | A | 2/1999 | Gomez et al. | 239/3 |
| 5,880,466 | A | 3/1999 | Benner | 250/281 |
| 5,894,841 | A | 4/1999 | Voges | 128/203.12 |
| 5,922,976 | A | 7/1999 | Russell et al. | 73/865.5 |
| 5,925,732 | A | 7/1999 | Ecker et al. | 530/334 |
| 5,945,678 | A | 8/1999 | Yanagisawa | 250/423 |
| 5,965,883 | A | 10/1999 | Lee et al. | 250/288 |
| 5,973,904 | A | 10/1999 | Pui et al. | 361/225 |
| 5,992,244 | A | 11/1999 | Pui et al. | 73/865.5 |
| 5,994,694 | A | 11/1999 | Frank et al. | 250/281 |
| 6,001,309 | A | 12/1999 | Gamble et al. | 422/100 |
| 6,027,699 | A | 2/2000 | Holcomb et al. | 422/186.04 |
| 6,051,189 | A | 4/2000 | Wick et al. | 422/82.01 |
| 6,093,557 | A | 7/2000 | Pui et al. | 435/173.1 |
| 6,137,112 | A * | 10/2000 | McIntyre et al. | 250/492.21 |
| 6,207,954 | B1 | 3/2001 | Andrien et al. | 250/288 |
| 6,277,334 | B1 | 8/2001 | Ecker et al. | 422/131 |
| 6,294,790 | B1 * | 9/2001 | Weinberger | 250/397 |
| 6,331,702 | B1 | 12/2001 | Krutchinsky et al. | 250/281 |
| 6,359,275 | B1 | 3/2002 | Bertsch et al. | 250/281 |
| 6,649,907 | B1 | 11/2003 | Ebeling et al. | |
| 6,727,497 | B1 | 4/2004 | Scalf et al. | |
| 6,784,421 | B1 * | 8/2004 | Park | 250/281 |
| 6,828,572 | B1 * | 12/2004 | Reece et al. | 250/492.21 |
| 6,831,280 | B1 * | 12/2004 | Scherer | 250/492.21 |
| 2001/0028866 | A1 | 10/2001 | Ecker et al. | |
| 2001/0030285 | A1 | 10/2001 | Miller et al. | |
| 2002/0011562 | A1 | 1/2002 | Park | |
| 2002/0158196 | A1 | 10/2002 | Berggren et al. | |
| 2002/0166961 | A1 | 11/2002 | Berggren et al. | |
| 2002/0190205 | A1 * | 12/2002 | Park | 250/292 |
| 2004/0219695 | A1 * | 11/2004 | Fox | 436/526 |

OTHER PUBLICATIONS

Allison, E.E. et al. (Nov. 1996) "Cubic Electrodynamic Levitation Trap With Transparent Electrodes;" *Rev. Sci. Instrum.* 67(11):3806-3812.

Benner, W.H. (1997) "A Gated Electronstatic Ion Trap to Repetitiously Measure the Charge and *m/z* of Large Electrospray Ions;" *Anal. Chem.* 69:4162-4168.

Chen, D.R. et al. (1995) "Electrospraying of Conducting Liquids for Monodisperse Aerosol Generation in the 4 nm to 1.8 μm Diameter Range;" *J. Aerosol. Sci.* 26:963-977.

Cheng, X. et al. (Feb. 1995) "Charge State Reduction of Oligonucleotide Negative Ions From Electrospray Ionization;" *Anal. Chem.* 67(3):586-593.

Comisarow, M.B. (1978) "Signal Modeling For Ion Cyclotron Resonance;" *J. Chem. Phys.* 69(9):4097-4104.

Cooper, D.W. et al. (Oct. 1973) "Neutralizing Charged Aerosols with Radioactive Sources;" *J. Colloid and Interface Sci.* 45:17-26.

Dahneke, B. et al. (1972) "An Aerosol Beam Spectrometer;" *Aerosol Sci.* 3:345-349.

Feng, X. et al. (2000) "Single Isolated Droplets With Net Charge as a Source of Ions;" *J. Am. Soc. Mass. Spectrom.* 11:393-399.

Fenn, J.B. et al. (Oct. 1989) "Electrospray Ionization for Mass Spectrometry of Large Biomolecules;" *Science* 246:64-71.

Fenn, J.B. et al. (1990) "Electrospray Ionization—Principles and Practice;" *Mass. Spec. Rev.* 9:37-70.

Fuerstenau, S.D. et al. (1995) "Molecular Weight Determination of Megadalton DNA Electrospray Ions Using Charge Detection Time-of-Flight Mass Spectrometry;" *Rapid Commun. Mass Spectrom.* 9:1528-1538.

Galley, P.J. et al. (1992) "Technique for Producing Capillaries with Reproducible Orifice Diameters for Uniform Droplet Generation;" *Appl. Spectrosc* 46(10):14601463.

Gajewski, J.B. (1984) "Mathematical Model of Non-Contact Measurements of Charges While Moving;" *J. of Electrostatics* 15:81-92.

Georghiou, G.E. et al. (1999) "Characterization of Point-plane Corona in Air at Radio Frequency Using a FE-FCT Method;" *J. Phys. D: Appl. Phys.* 32:2204-2218.

Griffey, R.H. et al. (1997) "Oligonucleotide Charge States in Negative Ionization Electrospray-mass Spectrometry are a Function of Solution Ammonium Ion Concentration;" *J. Am. Soc. Mass Spectrometry* 8:155-160.

Hager, D.B. et al. (Nov. 1994) "Droplet Electrospray Mass Spectrometry;" *Anal. Chem.* 66(22):3944-3949.

He, L. et al. (1999) "337 nm Matrix-Assisted Laser Desorption/Ionization of Single Aerosol Particles;" *J. Mass Spectrom.* 34:909-914.

Huang, E.C. et al. (Jul. 1990) "Atmosphere pressure ionization mass spectrometry;" *Anal. Chem.* 62(13):A713-725.

Karas, M. et al. (1988) "Laser Desorption Ionization of Proteins with Molecular Masses Exceeding 10,000 Daltons;" *Anal. Chem.* 60:2299-2306.

Karas, M. et al. (1987) "Matrix-assisted Ultraviolet Laser Desorption of Non-volatile Compounds;" *Int. J. Mass Spectrometry, Ion Proc.* 78:53-68.

Kaufman, S.L. et al. (Jun. 1996) "Macromolecule Analysis Based on Electrophoretic Mobility in Air: Globular Proteins;" *Anal. Chem.* 68:3703.

Kaufman, S.L. et al. (Jun. 1996) "Macromolecule Analysis Based on Electrophoretic Mobility in Air: Globular Proteins;" *Anal. Chem.* 68:1895-1904.

Kaufman, S.L. (1998) "Analysis of Biomolecules Using Electrospray and Nanoparticle Methods: the Gas-phase Electrophoretic Mobility Molecular Analyzer (GEMMA);" *J. Aerosol. Sci.* 29(5,6):537-552.

Kaufman, S.L. et al. (1998) "Analysis of a 3.6-MDa Hexagonal Bilayer Hemoglobin from *Lumbricus terrestris* Using a Gas-phase Electrophoretic Mobility Molecular Analyzer," *Anal. Biochem.* 259:195-202.

Kaufman, S.L. (Feb. 2000) "Electrospray Diagnostics Performed by Using Sucrose and Proteins in the Gas-phase Electrophoretic Mobility Molecular Analyzer (GEMMA)," *Anal. Chim. Acta* 406:3-10.

Kim, T. et al. (May 2000) "Design and Implementation of a New Electrodynamic Ion Funnel;" *Anal. Chem.* 72(10):2247-2255.

Kim, T. et al. (Oct. 2000) "Improved Ion Transmission from Atmospheric Pressure to High Vacuum Using a Multicapillary Inlet and Electrodynamic Ion Funnel Interface;" *Anal. Chem.* 72(20):5014-5019.
Kung, C-Y et al. (Mar. 1999) "Single-molecule Analysis of Ultradilute Solutions with Guided Streams of 1-μm Water Droplets;" *Applied Optics* 38(9):1481-1487.
Lazar, J.M. et al. (2000) "Electrospray Ionization Time-of-Flight Mass Spectrometric Detection for Fast Liquid Phase Separations;" *American Laboratory* 110-119.
Lennon J.D. et al. (1996) "Strategy for Pulsed Ionization Methods on a Sector Mass Spectrometer;" *Anal. Chem.* 68:845-849.
Likharev, K.K. (1999) "Single-Electron Devices and Their Applications;" *Proceedings of the IEEE* 87(4):606-632.
Limbach, P.A. (1996) "Indirect Mass Spectrometric Methods for Characterizing and Sequencing Oligonucleotides;" *Mass Spectrometry Reviews* 15:297-336.
Liu, P. et al. (1995) "Generating Particle Beams of Controlled Dimensions and Divergence: I. Theory of Particle Motion in Aerodynamic Lenses and Nozzle Expansions;" *Aerosol Sci. and Tech.* 22:293-313.
Liu, P. et al. (1995) "Generating Particle Beams of Controlled Dimensions and Divergence: II. Experimental Evaluation of Particle Motion in Aerodynamic Lenses and Nozzle Expansions;" *Aerosol Sci. and Tech.* 22:314-324.
Luginbuhl, Ph. et al. (May 2000) "Femtoliter Injector for DNA Mass Spectrometry;" *Sensors and Actuators B* 63:167-177.
Mann, M. et al. (1989) "Interpreting mass spectra of multiply charged ions;" *Anal. Chem.* 61:1702-1708.
Marshall, T.C. et al. (1982) "Measurements of Charged Precipitation in a New Mexico Thunderstorm: Lower Positive Charge Centers;" *J. of Geophysical Res.* 87(C9):7141-7157.
McLuckey, S.A. et al. (Mar. 1998) "Ion/Ion Proton-transfer Kinetics: Implications for Analysis of Ions Derived from Electrospray of Protein Mixtures;" *Anal. Chem.* 70:1198-1202.
Miliotis, T. et al. (Mar. 2000) "Capillary Liquid Chromatography Interfaced To Matrix-Assisted Laser Desorption/Ionization Time-Of-Flight Mass Spectrometry Using An On-Line Coupled Piezoelectric Flow-Through Microdispenser;" *J. Mass Spectrometry* 35:369-377.
Mouradian, S. (Mar. 1998) "Separation and Detection of Nucleic Acids;" Ph.D. Thesis, Chemistry, University of Wisconsin-Madison.
Mouradian, S. et al. (Mar. 1997) "DNA Analysis Using an Electrospray Scanning Mobility Particle Sizer;" *Anal. Chem.* 69:919-925.
Ogorzalek, R.R. et al. (1992) "A New Approach for the Study of Gas-phase Ion-ion Reactions Using Electrospray Ionization;" *J. Am. Soc. Mass Spectrometry* 3:695-705.
Park, M.A. et al. (1994) "An Inductive Detector for Time-of-Flight Mass Spectrometry;" *Rapid Comm. Mass. Spec.* 8:317-322.
Roos, R.A. et al. (1990) "Observation of The Interaction Between Artifically Activated Particles and Insulating Surfaces;" *J. Aerosol Sci.* 21 Suppl. 1:S131-S134.
Sarkissian, S.N. et al. (Oct. 2000) "Measurement of Phenyllactate, Phenylacetate, and Phenylpyruvate by Negative Ion Chemical Ionization-gas Chromatography/mass Spectrometry in Brain of Mouse Genetic Models of Phenylketonuria and Non-phenylketonuria Hyperphenylalaninemia;" *Anal. Biochem.* 280:242-249.
Scalf, M. et al. (Jan. 2000) "Charge Reduction Electrospray Mass Spectrometry;" *Anal. Chem.* 72:52-60.
Scalf, M. et al. (Jan. 1999) "Controlling Charge States of Large Ions;" *Science* 28(3):194-197.
Schultz, J.C. et al. (1999) "Polymerase Chain Reaction Products Analyzed by Charge Detection Mass Spectrometry;" *Rapid Commun. Mass. Spectrum.* 13:15-20.
Schultz, J.C. et al. (1998) "Mass Determination of Megadalton-DNA Electrospray Ions Using Charge Detection Mass Spectrometry;" *J. Am. Soc. Mass. Spectrom.* 9:305-313.
Shaw, R.A. et al. (Oct. 1999) "An Electrodynamic Levitation System for Studying Individual Cloud Particles Under Upper-tropospheric Conditions;" *J. Atmospheric and Oceanic Tech.* 17(7):940-948.
Smith, L.M. (Sep. 1996) "Sequence from Spectrometry: a Realistic Prospect?", *Nature Biotechnology* 14:1064-1065.
Smith, R.D. et al. (1991), "Principles and Practice of Electrospray Ionization-mass Spectrometry for Large Polypeptides and Proteins;" *Mass Spectrometry Rev.* 10:359-451.
Smith, R.D. et al. (May 1990) "New Developments in Biochemical Mass Spectrometry: Electrospray Ionization;" *Anal. Chem.* 62:882-899.
Stephenson, J.L., Jr. et al. (1998) "Charge Manipulation for Improved Mass Determination of High-mass Species and Mixture Components by Electrospray Mass Spectrometry;" *J. Mass Spectrom.* 33:664-672.
Stephenson, J.L., Jr. et al. (1998) "Simplification of Product Ion Spectra Derived from Multiply Charged Parent Ions via Ion/Ion Chemistry;" *Anal. Chem.* 70:3533-3544.
Stephenson, J.L., Jr. et al. (Nov. 1996) "Ion/Ion Proton Transfer Reactions for Protein Mixture Analysis;" *Anal. Chem.* 68:4026-4032.
Stradling, G.L. et al. (1993) "Ultra-High Velocity Impacts: Cratering Studies of Microscopic Impacts From 3 KM/S to 30 KM/S;" *Int. J. Impact Engng* 719-727.
Switzer, G.L. (Nov. 1991) "A Versatile System for Stable Generation of Uniform Droplets;" *Rev. Sci. Instrum.* 62(11):2765-2771.
TSI Incorporated Particle Instruments (1999) "Model 3800 Aerosol Time-of-Flight Mass Spectrometer".
TSI Incorporated, Particle Instrument Division (1999) "GEMMA* Method for Macromolecule/nanoparticle Analysis," [online, retrieved on May 13, 2000 from <http://www.tsi.com/particle/product/gemma/gemma.html>.
TSI Incorporated Particle Instruments (1998) "Model 3480 Electrospray Aerosol Generator".
TSI Incorporated Particle Instruments (1997) "TSI Working Prototype GEMMA* Macromolecule Analyzer;" *TSI Incorporated Advanced Technology Group.*
Vercoulen, P.H.W. et al. (1991) "An Instrument For Measuring Electric Charge On Individual Aerosol Particles;" *J. Aerosol Sci.* 22 Suppl. 1:S335-S338.
Wang, H. et al. (1998) "Ionization Within a Cylindrical Capacitor: Electrospray Without an Externally Applied High Voltage;" *Anal. Chem.* 70(2):205-212.
Weinheimer, A.J. (1988) "The Charge Induced on a Conducting Cylinder by a Point Charge and Its Applciation to the Measurement of Charge on Precipitation;" *J. Atmospheric and Oceanic Tech.* 5:298-304.
Yates, J.R. III (1998) "Mass Spectrometry and the Age of the Proteome;" *J. Mass Spectrom.* 33:1-19.

* cited by examiner

INDUCTIVE DETECTION FOR MASS SPECTROMETRY

CROSS-REFERENCE TO RELATED APPLICATIONS

This application claims priority under 35 U.S.C. 119(e) to provisional patent application 60/429,844, filed Nov. 27, 2002, which is hereby incorporated by reference in its entirety to the extent not inconsistent with the disclosure herein.

STATEMENT REGARDING FEDERALLY SPONSORED RESEARCH OR DEVELOPMENT

The invention was made with United States government support awarded by the following agencies:

NIH HG01808.

The United States has certain rights in this invention.

BACKGROUND OF INVENTION

Over the last several decades, mass spectrometry has emerged as one of the most broadly applicable analytical tools for detection and characterization of a wide class of molecules, ions and aggregates of molecules, ions or both. Mass spectrometric analysis is applicable to almost any species capable of forming an ion in the gas phase, and, therefore, provides perhaps the most universally applicable method of quantitative analysis. In addition, mass spectrometry is a highly selective technique especially well suited for the analysis of complex mixtures comprising a large number of different compounds in widely varying concentrations. Moreover, mass spectrometric methods provide very high detection sensitivity, approaching tenths of parts per trillion for some species.

As a result of the universal, selective and sensitive detection provided by mass spectrometry, a great deal of attention has been directed at developing mass spectrometric methods for analyzing complex mixtures of biomolecules. Indeed, the ability to efficiently detect components of complex mixtures of biological compounds via mass spectrometry would aid tremendously in the advancement of several important fields of scientific research. First, advances in the characterization and detection of samples containing mixtures of oligonucleotides by mass spectrometry would improve the accuracy, speed and reproducibility of DNA sequencing methodologies. Such advances would also eliminate problematic interference arising from secondary structure, which can be observed in conventional gel electrophoresis sequencing methodologies. Second, enhanced capability for the analysis of complex protein mixtures and multi-subunit protein complexes would revolutionize the use of mass spectrometry in proteomics. Important applications of mass spectrometry to proteomics include: protein identification, relative quantification of protein expression levels, single cell analysis, identification of protein post-translational modifications, and the analysis of labile protein—protein, protein—DNA and protein—small molecule aggregates. Finally, advances in mass spectrometric analysis of samples comprising complex mixtures of biomolecules would also allow the simultaneous characterization of high molecular weight and low molecular weight compounds. Detection and characterization of low molecular weight compounds, such as glucose, ATP, NADH, GHT, would aid considerably in elucidating the role of these molecules in regulating important cellular processes. While the benefits of mass spectrometric techniques for the analysis of complex mixtures of biological compounds are clear, the full potential for quantitative analysis of biological samples remains unrealized because there remain substantial problems in producing, analyzing and detecting gas phase ions generated from high molecular weight compounds.

Mass spectrometric analysis involves three fundamental processes: (1) gas phase ion formation, (2) mass analysis whereby ions are separated on the basis of mass-to-charge ratio (m/z) and (3) detection of ions subsequent to their eparation. The overall efficiency of a mass spectrometer (overall efficiency=(analyte ions detected)/(analyte molecules consumed)) may be defined in terms of the efficiencies of each of these fundamental processes by the equation:

$$E_{MS}=E_F \times E_{MA} \times E_D, \quad (I)$$

where $E_{MS}$ is the overall efficiency, $E_F$ is the ion formation efficiency (ion formation efficiency=(analyte ions formed)/(analyte molecules consumed during ion formation)), $E_{MA}$ is the mass analysis efficiency (mass analysis efficiency=(analyte ions mass analyzed)/(analyte ions consumed during analysis)) and $E_D$ is the detection efficiency (detection efficiency=(analyte ions detected)/(analyte ions consumed during detection)). Although mass spectrometry has been demonstrated to provide an important means of identifying biomolecules, current mass spectrometers have surprisingly low overall efficiencies for these compounds. For example, a quantitative evaluation of the efficiency of a conventional orthogonal injection time-of-flight mass spectrometer (Perseptive Biosystems Mariner) for the analysis of a sample containing a 10 kDa protein yields the following efficiencies, $E_S=1\times10^{-4}$, $E_{MA}=8\times10^{-7}$, and $E_D=9\times10^{-3}$, providing an overall efficiency of the mass spectrometer of 1 part in $10^{12}$. As a result of low overall efficiency, conventional mass spectrometric analysis of biomolecules requires larger quantities of biological samples and is unable to achieve the ultra low sensitivity needed for many important biological applications, such as single cell analysis of protein expression and post-translational modification. Therefore, there is a significant need in the art for more efficient ion preparation, analysis and detection techniques to capture the full benefit of mass spectrometric analysis for important biological applications.

Over the last decade, new ion preparation methods have been developed, such as matrix assisted laser desorption and ionization (MALDI) and electrospray ionization (ESI). These ionization methods provide greatly improved ionization efficiency for a wide range of compounds having molecular weights up to several hundred kiloDaltons. Moreover, MALDI and ESI ionization sources have been successfully coupled to a variety of mass analyzers, including quadrupole mass analyzers, time-of-flight instrumentation, magnetic sector analyzers, Fourier transform—ion cyclotron resonance instruments and ion traps, to provide selective identification of polypeptides and oligonucleotides in complex mixture of biological compounds. Mass analysis by orthogonal time-of-flight (TOF) methods has proven especially compatible for the analysis of high molecular weight biomolecules because they have no intrinsic limit to the mass range accessible, provides high spectral resolution and has a fast temporal response. The use of time-of-flight mass analysis with ESI and MALDI ion sources for proteomic analysis is described by Yates in Mass Spectrometry and the Age of the Proteome, Journal of Mass Spectrometry, Vol. 33, 1–19 (1998). As a result, MALDI-TOF and ESI-TOF have emerged as the two most commonly used mass spectrometric techniques for analyzing complex mixtures of biomolecules having high molecular weight.

In MALDI-TOF mass spectrometry, an analyte of interest is co-crystallized with a small organic compound present in high molar excess relative to the analyte, called the matrix. The MALDI sample, containing analyte incorporated into the organic matrix, is irradiated by a short (≈10 ns) pulse of UV laser radiation at a wavelength resonant with the absorption band of the matrix molecules. Rapid absorption of energy by the matrix causes it to desorb into the gas phase, thereby, volatilizing a portion of the analyte molecules. Gas phase proton transfer reactions ionize the analyte molecules within the resultant gas phase plume and generate gas phase analyte ions in singly and/or multiply charged states. Ions in the source region are accelerated by a high potential electric field, which imparts equal kinetic energy to each ion, and are conducted through an electric field-free flight tube. The ions are separated according to their velocities and are detected by a detector positioned at the end of the flight tube. Accordingly, light ions having higher velocities reach the detector first, while heavier ions having lower velocities arrive later.

In ESI-TOF mass spectrometry, a solution containing solvent and analyte is passed through a capillary orifice and directed at an opposing plate held near ground. The capillary is maintained at a substantial electric potential (approximately 4 kV) relative to the opposing plate, which serves as the counter electrode. This potential difference generates an intense electric field at the capillary tip, which draws some free ions in the exposed solution to the surface. The electrohydrodynamics of the charged liquid surface causes it to form a cone, referred to as a "Taylor cone." A thin filament of solution extends from this cone until it breaks up into droplets, which carry excess charge on their surface. The result is a stream, of small, highly charged droplets that migrate toward the grounded plate. Facilitated by heat, the flow of dry bath gases or both, solvent from the droplets evaporates and the physical size of the droplets decreases to a point where the force due to repulsion of the like charges contained on the surface overcomes surface tension and causes the droplets to fission into "daughter droplets." This fissioning process may repeat several times depending on the initial size of the parent droplet. Eventually, daughter droplets are formed with a radius of curvature small enough that the electric field at their surface is large enough to desorb analyte species existing as ions in solution. Polar analyte species may also undergo desorption and ionization during electrospray by associating with cations and anions in the liquid sample. Further, analyte ions may be formed from substantially complete desolvation of solvent from the charged droplets. The electrospray-generated ions are periodically pulsed into an electric field-free-flight tube positioned orthogonal to the axis along which the ions are generated. Ideally, all ions having the same charge-state are imparted with the same kinetic energy and, therefore, analyte ions in the flight tube are separate by mass according to their velocity. Lighter ions translate at higher velocities and are detected earlier in time by an ion detector positioned at the end of the flight tube, while heavier ions translate at lower velocities and are detected later in time.

Although the combination of modern ionization techniques and time-of-flight analysis methods has greatly expanded the mass range accessible by mass spectrometric methods, complementary ion detection methods suitable for the time of flight analysis of high molecular weight compounds remain less well developed. Indeed, the effective upper limit of mass ranges currently accessible by MALDI-TOF and ESI-TOF analysis techniques are limited by the sensitivity of conventional ion detectors for high molecular weight ions. For example, multichannel plate (MCP) detectors exhibit detection sensitivities that decrease with ion velocity. In time-of-flight analysis, this corresponds to a decrease in sensitivity with increasing molecular weight.

MCP detectors are perhaps the most pervasive ion detector in ESI-TOF and MALDI-TOF mass spectrometry. These detectors operate by secondary electron emission. Specifically, MCP detectors comprise a plurality of MCP channels, each of which release secondary electrons upon collision of a gas phase ion with a channel surface. Ejected secondary electrons are subsequently accelerated down discrete MCP channels and generate additional secondary electrons upon further collisions with the walls of the MCP channel. The electron cascade formed is collected at an anode and generates an output signal.

A number of substantial limitations of this detection technique arise out of the impact-induced mechanism of MCP detectors governing secondary electron generation. First, the yield of secondary electrons in a MCP detector decreases significantly as the velocity of ions colliding with the surface decreases. As time-of-flight detectors accelerate all ions to a fixed kinetic energy, high molecular weight ions have lower velocities and, hence, lower probabilities of being detected by MCP detectors. Second, the secondary electron yield of MCP detectors also depends on the composition and structure of colliding gas phase ions. Third, MCP detection is a destructive technique incapable of detecting the same ion or packet ions multiple times. Finally, MCP detectors generate electron cascades upon the impact of any species with the channel surface, including unwanted neutral species present in the ion flight tube.

As is apparent to those skilled in the art of mass spectrometry, the limitations associated with MCP detectors restrict the mass range currently accessible by MALDI-TOF and ESI TOF techniques, and hinder the quantitative analysis of samples containing high molecular weight biopolymers. Accordingly, there currently exists a need for ion detectors that do not exhibit decreasing sensitivities with increasing molecular weight and that do not have sensitivities dependent on the composition and structure of gas phase ions analyzed.

Over the last decade, considerable research has been directed at developing new ion detectors suitable for high molecular weight compounds. For example, inductive detectors have been developed that provide a non-destructive means of detecting highly multiply charged ions having high molecular weights. *Park and Callahan*, Rapid Comm. Mass Spec., 8, 317–322 (1988), *Lennon* et al., Anal. Chem., 68, 845–849 (1996), and *Benner*, Anal. Chem., 69, 4162–4168 (1997) describe applications of inductive detectors in mass spectrometric analysis. Inductive detectors operate by generating an induced electric charge upon interaction of gas phase ions with the surface of a sensing electrode. A primary advantage of inductive detectors is that they are sensitive only to an ion's charge, not an ion's velocity. In addition, inductive detectors are non-destructive. Therefore, a series of inductive detectors is capable of providing multiple detection methods wherein an ion or ion packet is repeatedly analyzed and detected. Although inductive detectors have been successfully applied to Fourier transform mass spectrometry, their use in time-of-flight mass analysis is substantially limited due to low sensitivity and poor detection efficiency.

U.S. Pat. No. 5,591,969 discloses a single inductive detector comprising a sensing tube providing non-destructive, time-of-flight analysis of ion packets. The cylindrical sensing electrode is configured to generate an induced electric charge upon passage of gas phase analyte ions through an axial bore in the detector. Although the detector reportedly provides detection sensitivity that is independent of velocity, the single electrode arrangement does not provide a means of characterizing the velocities of ions prior to acceleration and time-of-flight analysis. This limitation substantially reduces the mass resolution of the disclosed detector. In addition, the methods and devices described are limited to detection of packets of gas phase ions, rather than single ions. Finally, U.S. Pat. No. 5,591,969 is limited to embodiments employ a relatively short ion flight path corresponding to the length of a short sensing tube.

U.S. Pat. No. 5,770,857 discloses a method and apparatus for determining molecular weight which combines conventional ESI ion formation methods and an ion detection scheme comprising a first cylindrical inductive detector positioned a selected distance upstream of a second ion detector. The inductive detector is configured to provide a measurement of the start time of gas phase ions translating a flight path from first inductive detector to the second detector. Although U.S. Pat. No. 5,770,857 describes analysis methods employing a series of two detectors, the detector arrangement is reported to provide very low ion transmission efficiencies from an ion formation region to ion analysis and detection regions. Further, the mass analysis method of U.S. Pat. No. 5,770,857 relies on estimates of pre-acceleration ion velocity rather than direct measurements or ion velocity. Because knowledge of pre-acceleration ion velocity is critical for the accurate determination of mass-to-charge ratio, uncertainty in this important parameter degrades mass resolution and absolute mass accuracy attainable. Moreover, the spatial distribution of ions generated by the ion source and transmission scheme of the disclosed method substantially limits the sensitivity, mass analysis efficiency and detection efficiency attainable. First, free expansion of ions prior to detection results in a wide spatial distribution of gas phase ions. This spatial distribution reflects a wide variation in ion trajectories through the time-of-flight mass separation region, which substantially limits the diameters and lengths of cylindrical ion detectors employable. Second, the spatial distribution of the ions sampled impedes effective use of multiple inductive detectors in series because ion trajectories, which deviate substantially from the centerline of the detection scheme, will not be efficiently sampled by detectors positioned toward the end of a long flight path (>1 meter). Finally, the detection technique described provides a relatively low detection sensitivity, limited to detecting ions having charge states of hundreds of elemental charges.

It will be appreciated from the foregoing that a need exists for methods and devices suitable for efficient and sensitive analysis and detection of high molecular weight ions. Particularly, ion detectors having a detection sensitivity independent of molecular mass and structure are needed. Accordingly, it is an object of the present invention to provide methods, devices and device components capable of efficient analysis and detection of high molecular weight ions having high masses, particularly biomolecules. The present invention provides improved methods and devices for time-of-flight analysis combining spatially collimate electrically charged particle sources and multiple, non-destructive inductive detection. The analysis and detection methods of the present invention provide direct measurement of pre-acceleration and post-acceleration velocities and are capable of diverse applications of electrically charged particle analysis in coincidence, which substantially improves the sensitivity, resolution and absolute mass accuracy of time-of-flight analysis of high molecular weight ions.

SUMMARY OF THE INVENTION

The present invention provides methods, devices and device components using inductive detection for the analysis and detection of electrically charged particles. Particularly well-suited for the time-of-flight analysis of gas phase ions generated from high molecular weight compounds, the detection sensitivity of the electrically charged particle analyzers of the present invention is independent of ion velocity, composition and structure. The methods of time-of-flight analysis of the present invention provide substantial improvements in mass resolution, absolute mass accuracy, mass analysis efficiency and detection efficiency over mass analyzers of the prior art. In addition, the present invention includes methods, devices and device components providing diverse applications of electrically charged particle detection in coincidence, such as ion pre-selection and screening, coordinated acceleration—time-of-flight analysis and methods of molecular sorting.

The present invention comprises methods, devices and device components for analyzing the velocity of electrically charged particles, wherein charged particles translating substantially uniform, well-defined trajectories are conducted through an analysis and detection region having a plurality of charged particle detectors, at least one of which is a non-destructive inductive detector. In an exemplary embodiment, a spatially collimated beam of electrically charged particles or packets of electrically charged particles having momenta substantially directed along an electrically charged particle detection axis is conducted by a first inductive detector, through a selected charged particle flight path and is detected by a second charged particle detector. The first inductive detector is positioned close enough to the electrically charged particle detection axis such that the electric field associated with an electrically charged particle or packet of electrically charged particles induces electric charges on the detector surface, thereby generating a first detection signal at a first detection time. Upon passing by the first inductive detector, electrically charged particles of the spatially collimated beam translate through a selected flight path are detected by a second electrically charged particle detector. The second detector is positioned a selected distance downstream of the first inductive detector along the electrically charged particle detection axis. In a preferred embodiment, the second detector is also an inductive detector positioned close enough to the electrically charged particle detection axis such that the electric field associated with an electrically charged particle or packet of electrically charged particles induces electric charges on the detector surface, thereby generating a second detection signal at a second detection time. Electrically charged particle velocities are extracted from the temporal relationship between the first and second detector signals. Specifically, measurement of the temporal separation between the first and second detector signals allows the determination of charged particle velocities with the knowledge of the flight path of a given charged particle or packet of charged particles between the first and second detectors.

Optionally, the method of analyzing the velocities of electrically charged particles of the present invention further comprises steps of passing the spatially collimated beam of electrically charged particles or packet of charged particles through additional inductive detectors positioned sequentially along the electrically charged particle detection axis between the first and second detectors. In an exemplary embodiment, up to twenty inductive detectors are positioned in series along the electrically charged particle detection axis. Use of a plurality of inductive detectors is beneficial because is provides an efficient, low cost means of signal averaging, which improves the accuracy of the velocity measurements obtained. For example, treating detection signals from each inductive detector in the series as a separate measurement increases the resolution of the velocity measurement by $$\frac{1}{\sqrt{N}},$$

where N is the number of detectors employed.

In a preferred embodiment of the present invention, first and second detection signals comprise first and second temporal profiles of the electric charges induced on first and second inductive detectors, respectively. In this embodiment of the present invention, charged particle velocities are acquired upon each interaction between an electrically charged particle or packet of electrically charged particles and an individual inductive detector. Specifically, the first derivative of a given temporal profile provides entrance and exit times corresponding to the times in which the particle or packet of particles began and ended its electrostatic interaction the detector. With knowledge of the flight path associated with the electrostatic interaction, average particle velocities associated with the flight path corresponding to the duration of the electrostatic interaction with the detector may be calculated. In a preferred embodiment, the flight path of the electrostatic interaction is approximated as the length that the inductive detector extends along the charged particle detection axis. Preferred embodiments of the present invention having a plurality of inductive detectors in series, therefore, allow measurement of the change in particle velocity as a function of time (i.e. acceleration or deceleration), providing a temporal profile of particle velocity. Knowledge of particle velocity as a function of time is beneficial because it provides a temporal description of particle kinetic energy and can be used to predict the location of the particle in the analysis and detection region at any given future time. Further, knowledge of particle velocity as a function of time allows for precise calculation of the effects of friction on particle kinetic energies.

The flight paths of electrically charged particles and packets of particles analyzed by the devices and methods of the present invention reflect a narrow distribution of particle trajectories through the analysis and detection regions. Use of a spatially collimated beam of electrically charged particles having momenta substantially directed along a electrically charged particle detection axis is beneficial for several reasons. First, it ensures that the trajectories of charged particles or packet of particles through the analysis and detection region are substantially uniform. Therefore, velocity measurements provided by the present invention reflect a narrow distribution of electrically charged particle flight paths, which reduces uncertainty. Moreover, spatially collimate charged particle sources of the present invention allow use of long charged particle flight paths, which are beneficial because they increase the relative and absolute accuracies of the velocity measurements. Finally, use of spatially collimated electrically charged particle sources increases the efficiency of the ion analysis and detection processes employing inductive detectors. Specifically, use of a spatially collimated electrically charged particle source ensures that particles translate substantially uniform, well-defined trajectories passing close enough to each detector in the series to induce a measurable electric charge. Therefore, particles of the spatially collimated source are efficiently detected by multiple inductive detectors positioned in series throughout long particle flight paths.

The present invention also comprises methods, devices and device components for analyzing the mass-to-charge ratio (m/z) of electrically charged particles, particularly for ions generated from high molecular weight compounds. In an exemplary embodiment, a spatially collimated beam of charged particles or packets of particles having momenta substantially directed along an electrically charged particle detection axis is analyzed by a series of non-destructive inductive detectors located in pre-acceleration and post-acceleration regions. In the pre-acceleration region, the collimate beam is directed past a first inductive detector, wherein pre-acceleration velocities are measured. First inductive detector in the pre-acceleration region is positioned close enough to the electrically charged particle detection axis that the electric field associated with an electrically charged particle or packet of electrically charged particles induces electric charges on the detector surface. After translating through the pre-acceleration detection region, the spatially collimated beam of electrically charged particles is passed through an acceleration region, wherein the particles are accelerated by a known electrostatic potential applied by an electrically charged particle accelerator. The electrically charged particle accelerator imparts a selected, constant kinetic energy to the electrically charged particles but preferably does not substantially affect their trajectories or the extent of spatial collimation of the electrically charged particle source about the electrically charged particle detection axis. Upon acceleration, the spatially collimated beam of electrically charged particles passes through a post-acceleration region having a pair of inductive detectors, wherein post-acceleration electrically charged particle velocities are determined. First and second inductive detectors in the post-acceleration region are positioned in series along the electrically charged particle detection axis and separated by a selected post-acceleration flight path. In addition, first and second inductive detectors in the post-acceleration region are located close enough to the electrically charged particle detection axis that the electrically charged particles induce electric charges on the detector surfaces. Electrically charged particles pass by the first detector, translate the length of the flight path and subsequently pass by the second inductive detector. Accordingly, the particles induce electric charges on the surfaces of first and second inductive detectors in the post-acceleration region, thereby, generating first and second detection signals at first and second detection times, respectively. The temporal separation between first and second detection signals provides a measure of the average velocity of the electrically charged particle or packet of electrically charged particles over the flight-path between first and second detectors. With knowledge of the total kinetic energy imparted to the electrically charged particles, post-acceleration and pre-acceleration velocities may be related to mass-to-charge ratio.

Optionally, the present invention includes detector arrangements having a plurality of inductive detectors located in both pre-acceleration and post-acceleration regions. In these embodiments, additional inductive detectors are positioned along the electrically charged particle detection axis at positions corresponding to selected points along the electrically charged particle flight path. A preferred embodiment of the present invention providing high detection sensitivity, accuracy and mass resolution comprises two inductive detectors positioned in series along the electrically charged particle detection axis in the pre-acceleration region and up to twenty inductive detectors positioned in series along the electrically charged particle detection axis in the post-acceleration region. In addition, the present invention provides mass analyzers having a plurality of accelerators, wherein each accelerator is bordered on both sides of the charged particle detection axis by one or more inductive detectors.

The present invention also comprises a method of signal averaging for time-of-flight analysis wherein additional inductive detectors are positioned throughout the pre-acceleration and post-acceleration regions. The present method of signal averaging improves the accuracy, resolution and sensitivity of the methods and devices of time-of-flight analysis of the present invention. For example, treating the signal from each inductive detector in the series as a separate measurement of particle mass-to-charge ratio increases the resolution of the by $$\frac{1}{\sqrt{N}},$$

where N is the number of detectors employed.

Moreover, signals from multiple inductive detectors having selected positions along the electrically charged particle detection axis generate a periodic signal, corresponding to temporal evolution of electric charges induced on a series of detectors for a given ion trajectory. A Fourier Transform of the resultant periodic signal yields a dominant frequency, accurately characterizing the velocity of an electrically charged particle as it travels down the flight path and is multiply detected. Periodic signal generation permits frequency domain measurements providing improved noise discrimination, which increases sensitivity and mass resolution.

The present invention also comprises methods, devices and device components for measuring the charge states of individual electrically charged particles and packets of electrically charged particle sources. The magnitude of the electric charge induced on the surface of an inductive detector is proportional to (1) the electric charge of an individual charged particle or the sum of electric charges of particles comprising a packet particles and (2) the proximity of the particle(s) to the detector surface. In a preferred embodiment, the magnitude of the electric charge induced on the detector surface is about equal to the charge state of the electrically charged particle or packet of particles detected but is opposite in polarity. Accordingly, the maximum of the temporal profile of the induced electric charge provides a measurement of charge state. In a preferred embodiment providing a method of signal averaging, electrically charged particles are passed by a series of inductive detectors positioned sequentially along to the electrically charged particle detection axis. To provide an accurate measure of particle charge state, trajectories of the electrically charged particles are preferably substantially uniform and well defined. Substantially uniform and well defined electrically charged particle trajectories provide reproducible electrostatic interaction conditions for each charged particle analyzed, which allows the magnitude of the induced electric charge to be used as measurement of charged state. Further, substantially uniform and well defined electrically charged particle trajectories provide reproducible electrostatic interaction conditions for each inductive detector in series, providing the capability of efficient multiple measurements of charged state corresponding to a single particle or packet of particles.

In a preferred embodiment, the detector arrangement of the present invention is configured to simultaneously analyze the charge states and the mass-to-charge ratios of electrically charged particles. This embodiment, therefore, provides a method of measuring the absolute masses of electrically charged particles. In a preferred embodiment, a collimate beam comprising temporally and spatially separated individual electrically charged particles are passed through a series of inductive detectors located in pre-acceleration and post-acceleration regions. The temporal separation between electric charges induced on multiple inductive detectors allows for the determination of pre-acceleration and post-acceleration velocities and, thereby provides a measurement of mass-to-charge ratio (m/z). In addition, the individual temporal profiles of the charges induced on each inductive detector provide simultaneous measurements of charged state. Absolute masses may be extracted from the simultaneous and independent measurements of mass to charge ratio and charge state.

The combination of a spatially collimated electrically charged particle source and non-destructive detection via inductive detectors allows for efficient, multiple detection and analysis of individual electrically charged particles or discrete packets of electrically charged particles. In embodiments employing multiple detection, a plurality of detectors are sequentially positioned at different points along a well-defined, substantially uniform electrically charged particle trajectory, preferably the electrically charged particle detection axis. Importantly, the non-destructive inductive detectors of the present invention do not substantially affect the trajectories of the electrically charged particles detected and analyzed. Therefore, the well defined, substantially uniform flight paths of the electrically charged particles comprising the spatially collimated beam allows for detector arrangements in which a plurality of detectors are positioned such that the majority of electrically charged particles sampled induce measurable charges on the surfaces of every detector in a series of inductive detectors. Accordingly, the high degree of spatial collimation of the electrically charged particle source of the present invention provides improved analysis and detection efficiencies over prior art methods of time-of-flight detection employing multiple inductive detectors.

In addition, the well defined, substantially uniform flight paths of the electrically charged particles allows for detector arrangements having long electrically charged particle flight paths (>1 meter) in the pre-acceleration, post-acceleration region or both. In the post-acceleration region, longer flight path lengths achieve greater spatial separation of electrically charged particles having different masses and, therefore, time-of-flight measurements employing longer path lengths provide increased mass resolution. In a preferred embodiment providing high mass resolution, at least two inductive detectors are positioned along a well defined flight path having a length selected over the range of approximately 1 meter to approximately 3 meters. Importantly, the well-defined trajectories of the spatially collimated electrically charged particle beam ensure that high detection efficiencies are achieved for inductive detectors positioned along the entire length of the flight path. The methods of mass analysis in the present invention provides a substantial improvement in mass analysis and detection efficiencies over conventional mass spectrometers, approaching an improvement of about $1\times10^{12}$ over conventional mass spectrometers.

Spatially collimated charged particle sources of the present invention include any method or device capable of generating a stream of electrically charged particles or packets of electrically charged particles having well-defined, substantially uniform trajectories throughout an analysis and detection region. In a preferred embodiment, a spatially collimated ion source is provided by an aerodynamic ion lens system having an optical axis coaxial with a charge particle detection axis. An aerodynamic lens is preferred because it produces very spatially collimated particle streams with minimized particle loss. In addition, aerodynamic ion lens collimators are preferred for some applications because they are capable of efficiently passing a stream of electrically charged particles from a high-pressure charged particle formation region (≈1 atmosphere) to a low-pressure analysis region having a pressure less than or equal to approximately $1\times10^{-3}$. Further, aerodynamic ion lens systems are preferred because they eliminate mass-to-charge ratio biases associated with focusing ions via conventional electrostatic ion lenses.

In an exemplary embodiment, the aerodynamic ion lens system of the present invention has an internal end and an external end and comprises a plurality of apertures positioned at selected points along an electrically charged particle detection axis. The apertures have selected diameters, which may or may not be the same. The lens system is configured such that each aperture is concentrically positioned about the electrically charged particle detection axis. To operate as a electrically charged particle collimator, electrically charged particles and a laminar flow of bath gas enter the internal end and are conducted through the aerodynamic ion lens system. In the lens system, the fluid streamline compresses to pass through the constriction apertures and then expands back to its original radial dimensions downstream of the aperture. Due to inertial effects, however, electrically charged particles do not return to their original radial positions but instead return to positions closer to the electrically charged particle detection axis. Accordingly, the flow of bath gas through the lens system focuses the spatial distribution of the electrically charged particles about the electrically charged particle detection axis. The electrically charged particles exit the external end of the aerodynamic ion lens system having a momentum substantially directed along the electrically charged particle detection axis and having well defined, substantially uniform trajectories through the analysis and detection regions.

In a preferred embodiment, the aerodynamic ion lens system is substantially free of electric fields, electromagnetic fields or both generated from sources other than the electrically charged particles passing through the lens system. Maintaining an aerodynamic ion lens system substantially free of electric fields, electromagnetic fields or both is desirable to prevent disruption of the substantially uniform, well-defined particle trajectories. In addition, minimizing the extent of electric fields, electromagnetic fields or both is beneficial because it prevents unwanted loss of electrically charged particles on the walls of the aerodynamic ion lens system.

Alternatively, spatially collimated charged particle sources of the present invention may comprise one or more apertures positioned selected distances from the charge particle source. Collimators employing long distances from the apertures to the charged particle source result in charge particle streams having greater spatial collimation. Such collimator arrangements, however, do not provide for efficient transfer of charge particles into the analysis and detection region. Accordingly, use of spatially collimated charged particle sources comprising a series of apertures positioned long distances from the charge particle source results in charged particles losses.

Alternatively, spatially collimated charged particle sources of the present invention may comprise electrostatic or electrodynamic lens systems, such as cylindrical lenses, aperture lenses and Einsel lenses. Spatially collimated charged particles sources having electrostatic or electrodynamic lens systems, however, are susceptible to a number of aberrations including geometric aberrations, chromatic aberrations and aberrations caused by space charge effects. Further, charged particles focused by conventional electrostatic or electrodynamic lens systems tend to undergo divergence upon passing through the focal point of the lens system.

In another aspect of the invention, inductive detectors of the present invention comprise sensing electrodes capable of generating induced electric charges, or image charges, upon interaction of the electric field associated with an electrically charged particle or packet of electrically charged particles and the detector surface. The induced electric charge has a polarity opposite to that of the charged particle or packet of charged particles. Preferred inductive detectors are capable of generating induced electric charges with out destroying the electrically charged particle or packet of particles or substantially altering its trajectory through an analysis and detection region. Inductive detectors of the present invention are capable of monitoring the temporal profile of the electric charges induced on the surface of the detector. In a preferred embodiment of the present invention, temporal profiles generated for a given charged particle are substantially reproducible. Reproducibility in induced electric charge temporal profiles is provided by substantially uniform charged particle trajectories past or through the inductive detectors of the present invention. In a preferred embodiment, the induced electric charge temporal profile is substantially square-wave shaped. In an exemplary embodiment, the maximum of the induced electric charged temporal profile is proportional to the charge state of the incident electrically charged particle or summation of charge states of an incident packet of electrically charged particles.

Sensing electrodes of the present invention may be any shape including but not limited to ring electrodes, plate electrodes, and cylindrical electrodes. Electrodes having a central axial bore concentrically positioned about an electrically charged particle detection axis, preferably a cylindrically shaped central axial bore, are preferred because they are capable of achieving high sensitivity for monitoring charged state, velocity and mass to charge ratio of particles passing through their axial bores. The sensitivity of electrodes having an axial bore depends on the radial dimensions and length of the axial bore. Specifically, smaller diameter axial bores and smaller lengths provide greater sensitivity for detecting particles having small electric changes. Methods and devices of the present invention employing spatially collimated electrically charged particle sources having substantially uniform trajectories are capable of employing electrodes having small axial bore diameters selected over the ranging of about 0.1 mm to about 10 mm, preferably 0.5 mm to about 3 mm. Axial bore diameters less than 5 mm in diameter are preferred for some applications because they provide sensing electrodes having low capacitance. Although axial bores of the present invention may be of any length, lengths less than about 5 mm are preferred for some applications because they provide electrodes having low total capacitance. Sensing electrodes having low total capacitance are beneficial because they provide detectors with reduced noise, which are capable of very sensitive detection. Preferred tubular sensing electrodes of the present invention have an axis ratio greater than 2, which provides an induced electric charge (the image charge) approximately equal to the charge state of the electrically charge particle passing by the electrode surface and also minimizes the generated pulse width associated with the temporal profile of induced electric charge.

In an exemplary embodiment, the sensing electrodes of the present invention comprise tubes about 4 mm in length having an axial bore diameter of about 2 mm. This sensing electrode geometry is capable of detecting charged particles having a charged state of about 10 elemental charge units or greater. This is an improvement of about a factor of 15 over the detection sensitivities of inductive detectors of the prior art.

Sensing electrodes of the present invention may comprise any material capable of generating an induced electric charge upon passage of an electrically charged particle by the electrode surface. Preferred materials include metals having high conductivity such as copper. In a preferred embodiment providing very high detection sensitivity, the sensing electrode comprises superconducting quantum interference devices (SQUIDS). Electrodes comprising SQUIDS are essentially super conducting loops with extremely low noise characteristics, which provide higher detection sensitivity.

Charged particle detectors of the present invention also include alternate methods of measuring electric charge either by monitoring an induced electric charge or monitoring charge particles deposited on an anode. These alternative methods include but are not limited to use of faraday cup style detectors read out by radio-frequency single electron transistors, single electron transistors, cryogenic high electron mobility transistors and micro-cantilever.

In another aspect, the present invention comprises an active inductive detector having a plurality of high electron mobility transistors (HEMTs). HEMTs can be thought of as regular field effect transistors which are very small in size and exhibit very good noise characteristic because of their size. An advantage of using HEMTs for active inductive detection is that the current manufacturing process of these devices leaves the gate of the transistor exposed. Since HEMTs behave like field effect transistors it is not necessary to deposit charge on the gate of the transistor to make it active (or conduct), it is only necessary to expose the gate to an electric field (charge placed-close by). In a conventional inductive detector, charge is induced onto the conducting sensing electrode due to the electric field produced by the charged analyte ions which enter the detector. In other words, this system is passive, as there is no amplification of the signal. In order to obtain an active inductive detector a pickup tube is constructed from a plurality of HEMTs which have their gates facing the inside of the pickup tube (i.e. towards the passing ions). As charged particles enter the tube made from HEMTs the electric field associated with the charged ions cause the HEMTs to conduct. In an exemplary embodiment, gain is provided by an external current source placed across the source and drain of the transistors.

In a preferred embodiment, inductive detectors of the present invention further comprise at least one shielding element partially surrounding the sensing electrode. Shielding elements minimize electric charges induced on the sensing electrode by electric fields, magnetic fields, and electromagnetic fields from sources other than the electrically charged particles. Detector embodiments of the present invention including one or more shielding elements are capable of charged particle analysis and detection with substantially reduced noise. Therefore, these embodiments achieve higher detection sensitivities. In an exemplary embodiment, the sensing electrode is positioned between first and second shield elements comprising rings having an electric potential maintained substantially close to ground. The shield elements are positioned concentrically along the electrically charged particle detection axis. Alternatively, the shield element may comprise a stainless steel shielding cylinder, optionally having a cylindrical Teflon insulator therein. In this embodiment, the insulator and shielding cylinder are positioned concentrically along the electrically charged particle detection axis and maintained substantially close to ground. In a preferred embodiment providing reduced detector noise and improved sensitivity, the lengths that the steel shielding cylinder extends past each end of the sensing electrode along the charged particle detection axis is at least as long as the radius of the tubular sensing electrode.

The mass analysis and detector arrangements of the present invention also support diverse applications of electrically charged particle analysis in coincidence. Electrically charged particle analysis in coincidence refers to analysis techniques for streams of electrically charged particles translating a trajectory from an upstream coincidence signal generation region through a downstream region wherein the coincidence signal is used to achieve a desired function. In an exemplary method of electrically charged particle analysis in coincidence, at least one non-destructive inductive detector is positioned in the coincidence signal generation region. Upon passage of a electrically charged particle or packet of electrically charged particles through the coincidence signal generation region, the signal generated by the inductive detectors provides a signal characterizing the detection event to devices or device components positioned downstream. Importantly, the coincidence signal is generated at a time sufficiently earlier than the arrival time of the electrically charged particle to the device(s) or device component(s) positioned downstream such that the signal can be used to achieve a selected function.

One aspect of charged particle detection in coincidence of the present invention comprises a method of coordinated acceleration, time-of-flight analysis. In this embodiment an inductive detector or series of inductive detectors are positioned upstream of a electrically charged particle accelerator to provide a coincidence signal which coordinates the appearance of a electrically charged particle or packet of charge particles into an acceleration region with the timing of a time-of-flight analysis extraction pulse. In a preferred embodiment, an inductive detector or series of inductive detectors, positioned a selected distance upstream of a electrically charged particle accelerator, measures the velocities of the electrically charged particles or packets of electrically charged particles in a coincidence signal generation region. With knowledge of the selected path length between inductive detector in the coincidence signal generation region and the particle accelerator, the measured velocity may be used to precisely trigger the timing of a time-of-flight acceleration pulse. Use of a coincidence signal to trigger the acceleration of particles prior to time-of-flight analysis ensures uniform charged particle extraction conditions and allows for a better evaluation of kinetic energies imparted to the electrically charged particles or packets of electrically charged particles. Further, use of a coincidence signal provides a means of achieving a 100% duty cycle in the devices and device components of the present invention because every electrically charged particle or packet of electrically charged particles may be accurately accelerated and analyzed.

Another aspect of charged particle detection in coincidence—of the present invention comprises a method of charged particle pre-selection and screening. In this aspect of the present invention a single inductive detector or series of inductive detectors are positioned upstream of a time of flight analysis region to provide a coincidence signal which is used to achieved pre-selection of electrically charged particles that are subsequently multiply analyzed by a series of detectors in a time-of-flight analyzer. In a preferred embodiment, a pair of inductive detectors determines the mass-to-charge ratio, velocity, and/or charged state of spatially separated electrically charged particles or packet of electrically charged particles in a coincidence signal generation region. The measured mass-to-charge ratio is subsequently used to classify each electrically charged particle or packet of electrically charged particles. Classification may be based on molecular mass, mass to charge ratio or velocity. All particles classified in the coincidence signal generation region are tagged as either a particle of interest or an undesired particle. Particles of interest are subsequently analyzed downstream by a plurality of detectors in a downstream time-of-flight region, while undesired particles are allowed to pass undetected through the analyzer. Therefore, the coincidence signal generated serves the purpose of coordinating a system of molecular screening, wherein only desired particles are analyzed. This application of electrically charged particle detection in coincidence improves the repetition rates employable in time-of-flight analyzers by eliminating instrument resources wasted detecting and analyzing undesired particles generated from a sample. In addition, the technique may be used to increase the sensitivity and mass resolution for rare, but known, components of complicated mixtures by only analyzing those events which generate an appropriate coincidence signal.

In another aspect, the present invention comprises devices and methods for measuring the mobility of charged particles, such as gas phase ions. In an exemplary embodiment comprising a device for measuring electrophoretic mobility, packets of charged particles are released into an elevated pressure region of a selected length and translate along a detection axis. At least one inductive detector is located in the elevated pressure region and positioned close enough to the detection axis that the electric field of the charged particles induce electric charges on the detector. As the charged particles pass through the elevated pressure region they are separated on the basis of electrophoretic mobility and are nondestructively detected by the inductive detector(s). As all charged particles in the packet are released at approximately the same start time, the temporal evolution of induced electric charges on the inductive detector provides measurements of the translation times of charge particles through the elevated pressure region, thereby providing a direct measurement of electrophoretic mobilities. In a preferred embodiment, two or more inductive detectors are positioned in the elevated pressure region two provide multiple measurements of electrophoretic mobility for each charged particle. Electrophoretic mobility relates to the molecular structure and mass of a charged particle. Accordingly, an advantage of this analysis method is that it allows ions of the same mass to be distinguished on the basis of their electrophoretic mobility, which in turn depends on the molecular structure of the charged particles analyzed.

In a preferred embodiment, a time of flight drift tube is operationally coupled to the elevated pressure region of the electrophoretic mobility analyzer of the present invention. In an exemplary embodiment, an extraction region of an orthogonal time-of-flight drift tube is operationally coupled to the downstream end of the elevated pressure region. Packets of charged particles are released into the elevated pressure region. In a preferred embodiment, electrophoretic mobility is directly measured in the elevated pressure region using one or more inductive detectors. Upon exiting the elevated pressure region, the charged particles are sampled in an orthogonal extraction region which is continuously being pulsed. In a preferred embodiment, the repetition rate of the pulsed extractor is based on the longest charged particle flight time through the orthogonal drift tube, which corresponds to the highest m/z ratio. Charged particle are accelerated and translate through an electric field free time-of-flight drift tube and are detected, preferably using inductive detection. This embodiment of the present invention provides direct measurement of electrophoretic mobility and flight time. Accordingly, this embodiment of the present invention may be used to determine m/z ratios and complementary information related to molecular structure. In a preferred embodiment, an inductive detector is positioned in the elevated pressure region to provide a coincidence signal which may be used to trigger the orthogonal extraction of charged particles into the time-of-flight drift tube. This arrangement has the benefit of increasing the duty cycle of the charged particle analyzer. In addition, placement of an inductive detector in the elevated pressure region allows preselection and molecular screening based on electrophoretic mobility. Therefore, the retention time of charged particles in the elevated pressure region may be used to only extract charged particles of interest.

The non-destructive nature of the mass analysis and detection methods of the present invention makes them ideally suited for multiple stage mass spectrometry, wherein an ion is analyzed and detected before and after undergoing a change in composition or a series of changes in composition. In an exemplary embodiment comprising a method of tandem mass spectrometry, a spatially collimated beam of gas phase parent ions are analyzed in a first time-of-flight mass spectrometer stage, passed through a perturbation region wherein a change of composition is induced generating daughter ions and the daughter ions are subsequently analyzed in a second time-of-flight stage. Non-destructive mass analysis of parent and daughter ions by the methods of the present invention in the first and second stages provides information related to the structure and composition of the parent ion. Changes in composition may be induced by methods well known in the art of mass spectrometry including but not limited to collisions with inert gas phase species, temperature changes, pressure changes, mass tagging, photolysis and gas phase chemical reactions with ions and molecules. In a preferred exemplary embodiment, a parent ion formed from a polymer, such as a polypeptide or oligonucleotide, is broken up into daughter ions corresponding fragments comprised of its various subunits for identification. Because methods of changing the composition of the parent ion may disrupt the well-defined trajectory of the spatially collimated electrically charged particle source, methods of the present invention may further comprise one or more charged particle collimators for efficiently transmitting daughter ions into downstream time-of-flight stages of the mass spectrometer. Optionally, tandem mass analyzers of the present invention may have a plurality of perturbation regions and accompanying time-of-flight analysis regions The present invention also comprises methods and devices capable of efficient, high resolution molecular sorting. In an exemplary embodiment, electrically charged particles translating along an electrically charged particle detection axis are mass analyzed by a plurality of inductive detectors in a time-of-flight region and passed into a mass sorting region. Electrically charged particles having a pre-selected mass-to-charge ratio are deflected by a pulsed electrostatic potential generated by an electrostatic sorting element. In a preferred embodiment, the sorting element is triggered by the inductive detectors in the time-of-flight region. Deflected electrically charged particles are directed along a electrically charged particle collection axis that is different from the charged particle detection axis and are subsequently collected by a collection channel. Optionally, methods and devices of molecular sorting of the present invention may comprise a plurality of collection channels corresponding to different pre-selected molecular masses or ranges of masses.

Electrically charged particle analyzers and detectors of the present invention are capable of analyzing and detecting electrically charged particles including but not limited to gas phase ions, aggregates comprising a plurality of ionic species, aggregates comprising one or more neutral species and one or more ionic species, charged droplets and particulate matter. Particularly, the electrically charged particle analyzers and detectors of the present invention are capable of detecting electrically charged particles generated from high molecular weight compounds. In an exemplary embodiment, the methods and devices of the present invention are particularly well suited for the analysis of biopolymers including but not limited to polypeptides, proteins, glycoproteins, oligonucleotides, DNA, RNA, polysaccharides, and lipids and aggregates thereof.

The devices and methods of the present invention may be used to analyze and detect spatially collimated electrically charged particle sources comprising streams of individual electrically charged particles or spatially collimated electrically charged particle sources comprising streams of discrete packets of charged particles. Time of flight analysis of electrically charged particle sources comprising a stream of individual particles that are temporally and spatially separated from each other is preferred for some applications because it provides improved mass resolution and mass accuracy over prior art mass analyzers. Specifically, the ability to accurately characterize the velocity of an individual electrically charged particle in the pre-acceleration region allows for precise calculation of the kinetic energy prior to acceleration and subsequent time-of-flight analysis. As the electrically charged particle flight time reflects the sum of the initial kinetic energy and the additional kinetic energy imparted by acceleration, accurate characterization of initial kinetic energy results in a higher resolution measurement of mass-to-charge ratio.

Further, time-of-flight analysis of electrically charged particle sources comprising a stream of individual particles that are temporally and spatially separated from each other is preferred for some applications because it provides improved detection efficiency and sensitivity over prior mass analyzers. Spatial separation of electrically charged particles before and during time of flight analysis minimizes mutual repulsion between particles having the same polarity. Minimizing mutual repulsion is beneficial because it preserves the well defined, substantially uniform electrically charged particle trajectories by reducing deflections arising from interactions between electrically charged particles. Therefore, individual time-of-flight analysis of spatially separated single ions minimizes ion losses associated with deviations from uniform ion trajectories and enhances the benefits of signal averaging by multiple detection via a plurality of inductive detectors. Further, minimizing mutual repulsion between electrically charged particles preserves the narrow spatial distribution of electrically charged particle trajectories resulting in improved resolution.

A significant advantage of the increased sensitivity of the present methods and devices is that measurable signals associated with individual electrically charged particles may be generated from the analysis of very small samples. Further, the improved mass analysis and detection efficiencies of the present invention substantially decreases the quantity of sample that is consumed during analysis. Accordingly, the present invention is especially amenable for the analysis of samples present in very minute quantities (e.g. 20 picoliters), such as forensic samples and biological samples. In a preferred embodiment, the methods and devices of the present invention are used to analyze of the composition of samples comprising single cells. In this embodiment, a sample is prepared by lysing an individual analyte cell and subsequently generating a stream of spatially and temporally separated individual electrically charged particles from the various compounds present in the cell, such as proteins, protein—protein aggregates, carbohydrates, RNA, DNA and DNA—protein aggregates. Next, the electrically charged particle stream is analyzed using the methods and devices of the present invention for determining velocity, charged state, mass-to-charge ratio and absolute mass. The method of single cell analysis of the present invention is beneficial because it provides the high sensitivity necessary for detection of very low levels of biomolecules present in a single cell. Further, this method provides a means of directly probing the composition of proteins and protein—protein aggregates under cellular conditions, which is useful for identifying post translation changes and protein—protein aggregates that play important roles in regulating cellular function.

The methods, devices and devices components for detecting electrically charged particles of the present invention may be used with mass analyzers other than time-of-flight mass analyzers. Specifically, the detector arrangements of the present invention are suitable for detecting ions analyzed by other mass analysis methods including but not limited to quadrupole mass analyzers, Wien filters, ion traps and magnetic sector analyzers. Detector arrangements of the present invention may be positioned upstream or downstream of these mass analyzers and may be used to provide applications of electrically charged particle detection in coincidence. Due to their non-destructive nature, the methods and detector arrangements of the present invention are especially useful for tandem mass spectrometry applications involving a plurality of TOF and/or non-TOF mass analyzers, perturbation regions and inductive detection regions. For example, incorporation of charged particle detectors of the present invention into a TOF-TOF mass spectrometer provides a sensitive means of characterizing precursor ions prior to dissociation. Incorporation of charged particle detectors of the present invention into a TOF-TOF mass spectrometer also would eliminate the need to evacuate the collision cell to obtain a measurement of precursor ion mass to charge ratio scan because this determination could be obtained with the inductive detector placed before the ion selector. In addition, placement of an inductive detector after the ion selector may be used to verify the gating of the ions to insure the quality of the selection and determine if unwanted parent ions entered to collision cell.

The invention is further illustrated by the following description, examples, drawings and claims.

BRIEF DESCRIPTION OF THE DRAWINGS

FIG. 2A is a schematic drawing showing a side view of an exemplary inductive detector comprising a sensing ring electrode and two shield elements. FIG. 2B is a schematic drawing showing a top plan view of an exemplary inductive detector comprising a tubular sensing electrode, Teflon insulator and cylindrical shield element.

FIG. 6A shows the time-of-flight spectrum acquired by the MCP detector and FIG. 6B shows the time-of-flight spectrum acquired by the inductive detector. The series of peaks shown in FIGS. 6A and 6B correspond to $[M+H]^+$, $[2M+H]^+$, $[3M+H]^+$, $[4M+H]^+$ and $[5M+H]^+$, wherein M indicates insulin.

FIG. 7A shows the time-of-flight spectrum acquired by the MCP detector and FIG. 6B shows the time-of-flight spectrum acquired by the inductive detector. The peaks shown in FIGS. 7A and 7B correspond to singly charged $(dT)_{25}$ and its dimer.

FIGS. 8A and 8B correspond to the MALDI ionization of a sample derived from a 1 mM solution of insulin in water. FIGS. 8C and 8D correspond to the MALDI ionization of a sample derived from a 500 μM solution of ubiquitin in water. FIGS. 8C and 8D correspond to the MALDI ionization of a sample derived from a 800 μM solution of cytochrome c in water.

FIG. 11A shows a spectrum observed with first and second shielding grids in place. FIG. 11B shows a spectrum observed with first and second shielding grids withdrawn. For the sake of comparison, FIG. 11C shows both a spectrum observed with shielding grids in place and a spectrum observed with grids withdrawn.

DETAILED DESCRIPTION OF THE INVENTION

Figure 1:
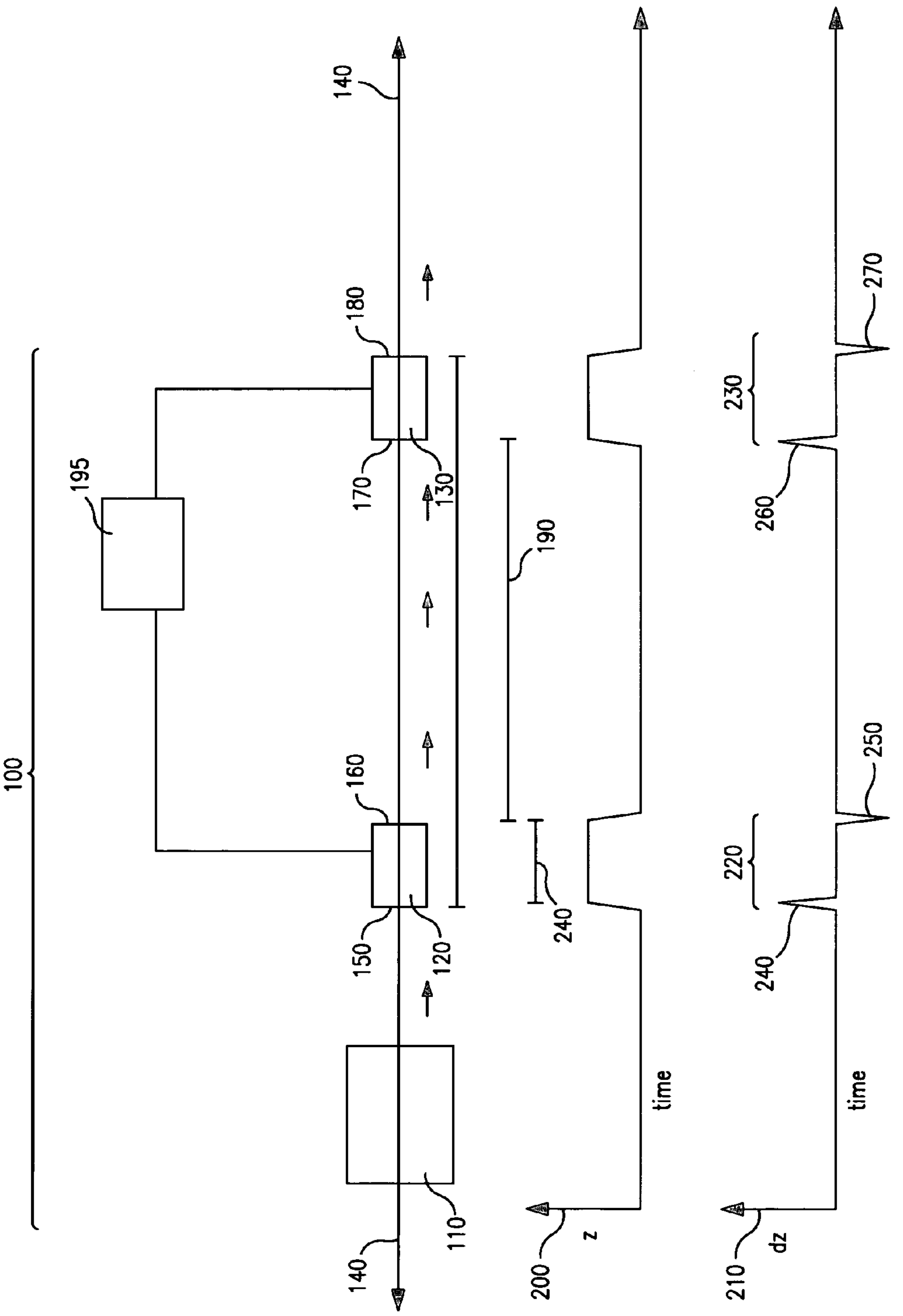
FIG. 1 is a schematic drawing showing a top plan view of an exemplary device for analyzing the velocity of charged particles or packets of charged particles. An exemplary temporal profile of the electric charges induced on first and second inductive detectors upon the passage of a charged particle or packet of charged particles past the detectors is shown in FIG. 1. Also shown in FIG. 1 is the differentiated temporal profile of the electric charges induced on first and second inductive detectors

The following definitions apply herein.

"Polymer" takes its general meaning in the art and is intended to encompass chemical compounds made up of a number of simpler repeating units (i.e., monomers), which typically are chemically similar to each other, and may in some cases be identical, joined together in a regular way. Polymers include organic and inorganic polymers, which may include co-polymers and block co-polymers. Reference to biological polymers in the present invention includes, but is not limited to, polypeptides, proteins, glycoproteins, oligonucleotides, DNA, RNA, polysaccharides, and lipids and aggregates thereof.

"Axis ratio" of a tubular sensing electrode refers to the ratio of the length of the cylinder to the diameter of the axial bore and is given by the following expression:

$$\text{axis ratio} = \frac{(\text{length})}{(\text{diameter})}. \tag{I}$$

"Ion" refers generally to multiply or singly charged atoms, molecules, or macromolecules, of either positive or negative polarity and may include charged aggregates of one or more molecules or macromolecules.

"Electrically charged particles" refers to any material in the gas phase having an electric charge of either positive or negative polarity. For example, electrically charged particles may include, but are not limited to, ions, aggregates of ions, ion complexes, electrically charged clusters, electrically charged particular matter, electrically charged droplets and electrically charged crystals.

"Aggregate(s)" of chemical species refer to two or more molecules or ions that are chemically or physical associated with each other in a liquid sample. Aggregates may be non-covalently bound complexes. Examples of aggregates include, but are not limited to, protein-protein complexes, lipid—polypeptide complexes, protein—DNA complex.

"Detection sensitivity" refers to the ability of an inductive detector to detect charged particles having low charged states. Specifically, detection sensitivity refers to the lowest charge state of an electrically charged particle or summation of charged states of a plurality of charged particles providing a signal to noise ratio equal to 1. Exemplary inductive detectors of the present invention have detection sensitivities of about 10 elemental charges.

The phrase “momentum substantially directed along an axis” refers to motion of an ion, droplet or other electrically charged particle that has a velocity vector that is substantially parallel to the defining axis. In preferred embodiments, the invention of the present application provides droplet sources and ion sources with output having a momentum substantially directed along the charged particle detection axis. The term “momentum substantially directed” is intended to be interpreted consistent with the meaning of this term by persons of ordinary skill in the art. The term is intended to encompass some deviations from a trajectory absolutely parallel to the charged particle detection axis. These deviations comprise a cone of angles deviating from the charged particle detection axis. Reference to “angle deviating from the charged particle detection axis” is intended to refer to angles formed by the intersection of the charged particle trajectory and the charged particle detection axis. It is preferable for many applications that deviations from the charged particle detection axis are minimized. In a preferred embodiment, deviations of charged particle trajectories from the charged particle detection axis are 500 milliradians or less. It is more preferred in some applications that the deviations of charged particle trajectories from the charged particle detection axis are 10 milliradians or less. It is most preferred for some applications that the deviations of charged particle trajectories from the charged particle detection axis are 0.5 milliradians or less.

“Gas phase analyte ion(s)” refer to multiply charged ions, singly charged ions or both generated from chemical species in samples. Gas phase analyte ions of the present invention may be of positive polarity, negative polarity or both. Gas phase analyte ions are characterized in terms of their charge-state, which is selectively adjustable in the present invention.

“Bath gas” refers to a collection of gas molecules that transport charged particles through the aerodynamic lens system. Preferably, bath gas molecules do not chemically interact with the charged particles of the present invention. Common bath gases include, but are not limited to, nitrogen, oxygen, argon, air, helium, water, sulfur hexafluoride, nitrogen trifluoride and carbon dioxide.

“Downstream” and “upstream” refers to the direction of flow of a stream of ions, molecules or charged particles. Downstream and upstream is an attribute of spatial position determined relative to the direction of a flow of bath gas, gas phase analyte ions and/or charged particles.

“Packet of electrically charged particles” refers to a spatially discrete collection of electrically charged particles. Packets of electrically charged particles may comprise a plurality of charged particles each having the same mass or a plurality of charged particles with different masses. The present invention provides methods, devices and devices components capable of analyzing and detecting packets of charged particles.

“Linear flow rate” refers to the rate by which a flow of materials pass through a given path length. Linear flow rate is measure in units of length per unit time (typically cm/s “Selectively adjustable” refers to the ability to select the value of a parameter over a range of possible values. As applied to certain aspects of the present invention, the value of a given selectively adjustable parameter can take any one of a continuum of values over a range of possible settings.

“In fluid communication” refers to materials, devices and device components that are in contact with a fluid such as a flow of bath gas, charged particles or both. Materials devices and device components in fluid communication may be characterized as upstream or downstream of each other.

“Spatially collimated” refers to the three dimensional spatial distribution of charged particles centered about a defining axis, preferably the electrically charged particle detection axis. A spatially collimate charged particle source refers to a source of charged particles have three dimensional spatial distribution of charged particles centered about a defining axis, preferably the electrically charged particle detection axis.

“Duty cycle” is a measurement of the ratio of the number of ions generated to the number of ions analyzed and may be express by the following equation:

$$\text{duty cycle} = 100\times\left(\frac{\text{number of ions generated}}{\text{number of ions analyzed}}\right)$$

Preferred analyzers of the present invention have a 100% duty cycle.

In the following description, numerous specific details of the devices, device components and methods of the present invention are set forth in order to provide a thorough explanation of the precise nature of the invention. It will be apparent, however, to those of skill in the art that the invention can be practiced without these specific details. Reference in the specification to “a preferred embodiment,” “a more preferred embodiment” or “an exemplary embodiment” means that a particular feature, structure, or characteristic set forth or described in connection with the embodiment is included in at least one embodiment of the invention. Reference to “preferred embodiment,” “a more preferred embodiment” or “an exemplary embodiment” in various places in the specification do not necessarily refer to the same embodiment.

Referring to the drawings, like numerals indicate like elements and the same number appearing in more than one drawing refers to the same element.

This invention provides methods and devices for analyzing and detecting electrically charged particles, especially suitable for gas phase ions generated from high molecular weight compounds. Particularly, the present invention provides devices and methods for determining the velocity, charged state or both of electrically charged particle and packets of electrically charged particles. More particularly, the present invention provides methods and devices for the time-of-flight analysis of electrically charged particles comprising spatially collimated sources.

FIG. 1 is a schematic of an exemplary embodiment of the methods and devices of the present invention for analyzing the velocity of electrically charged particles. The illustrated charged particle analyzer (100) comprises spatially collimated charged particle source (110), first inductive detector (120) and second inductive detector (130), each in fluid communication with each other. First inductive detector (120) has an internal end (150) and an external end (160) and is positioned close enough to charged particle detection axis (140) such that passage of a charged particle or packet of charged particles by the detector induces an electric charge on the detector surface. Second inductive detector (130) has an internal end (170) and an external end (180) and is positioned close enough to charged particle detection axis (140) such that passage of a charged particle or packet of charged particles by the detector induces an electric charge on the detector surface. First and second inductive detectors are positioned along electrically charged particle detection axis (140) and separated by selected flight path (190). First and second inductive detectors are operationally connected to signal processor (195), which is capable of monitoring, storing and analyzing the temporal evolution of charges induced on first and second detectors. In a preferred embodiment, the signal processor comprises a computer.

Spatially collimated charged particle source (110) produces a stream of electrically charged particles having momenta substantially directed along the charged particle detection axis (140). In a preferred embodiment, spatially collimated charged particle source (110) is configured to provide spatially and temporally separated electrically charged particles or packet of electrically charged particles, which translate substantially uniform, well defined trajectories past first inductive detector (120) and second inductive detector (130). Optionally, a flow of bath gas passing from spatially collimated charged particle source (110) through the first inductive detector (120) and the second inductive detector (130), depicted as arrows in FIG. 1, is used to conduct the stream of electrically charged particles past first and second inductive detectors.

Also shown in FIG. 1 is a temporal profile of induced electric charges (200) and a differentiated temporal profile of induced electric charges (210), corresponding to the electric charges induced on first and second inductive detectors upon the passage of an electrically charge particle or packet of electrically charged particles through analyzer (100). As shown in temporal profile (200) in FIG. 1, a charged particle or packet of charged particles induces a charge on the surface of first detector (120), which rapidly falls off upon passing by the first detector. Next, the charged particle or packet of charged particles translates along the charged particle detection axis wherein it induces a charge on the surface of second detector (130), as shown in temporal profile (200), which rapidly falls off upon passing by the second detector. Differentiation of temporal profile (200) yields differentiated temporal profile (210) characterized by first bipolar signal (220) and second bipolar signal (230), which may be used to determine the velocity of the charged particle at various points throughout the analysis region. First, the difference between positive and negative peaks in first bipolar signal (220) is a measurement of the transport time of the charged particle past the first inductive detector. Bipolar signal (220) is related to the average velocity during the electrostatic interaction between the first detector and the charged particle or packet of the charged particles by the expression:

$$\text{ion velocity} = \frac{L}{(T_2 - T_1)}, \qquad \text{(II)}$$

wherein L is the flight path of electrically charged particles or packets of electrically charged particles between first and second detectors, $T_1$ is the time associated with the maximum of positive peak (240) and $T_2$ is time associated with the maximum of negative peak (250). Flight path (240) may be approximated as the distance the inductive detector extends along charged particle detection axis (140). Similarly, positive peak (260) and negative peak (270) of second bipolar signal (230) may be used to calculate the average velocity during the electrostatic interaction between the second detector and the charged particle or packet of the charged particles. The average velocity of the charged particle or packet of charged particles over selected flight path (190) may also be calculated via equation II using the temporal separation between negative peak (250) and positive peak (260). Accordingly, the methods and devices of analyzing charged particles of the present invention are capable of characterizing particle velocities in various regions of the analysis region, providing a temporal profile of particle velocity.

In a preferred embodiment, first and second inductive detectors are housed in a detection and analysis region having a substantially constant pressure. Alternatively, the detectors may be house in a differentially pumped region having a pressure gradient along the charge particle detection axis. In a preferred embodiment comprising a time-of-flight charged particle analyzer, first and second inductive detectors are located in a low pressure region having a pressure less than or equal to about $1\times10^{-3}$ Torr. Detector arrangements having inductive detectors in a low pressure region are preferred in some applications because they provide flight time measurements that are substantially independent of the structure of the charged particles analyzed.

Figure 2A:
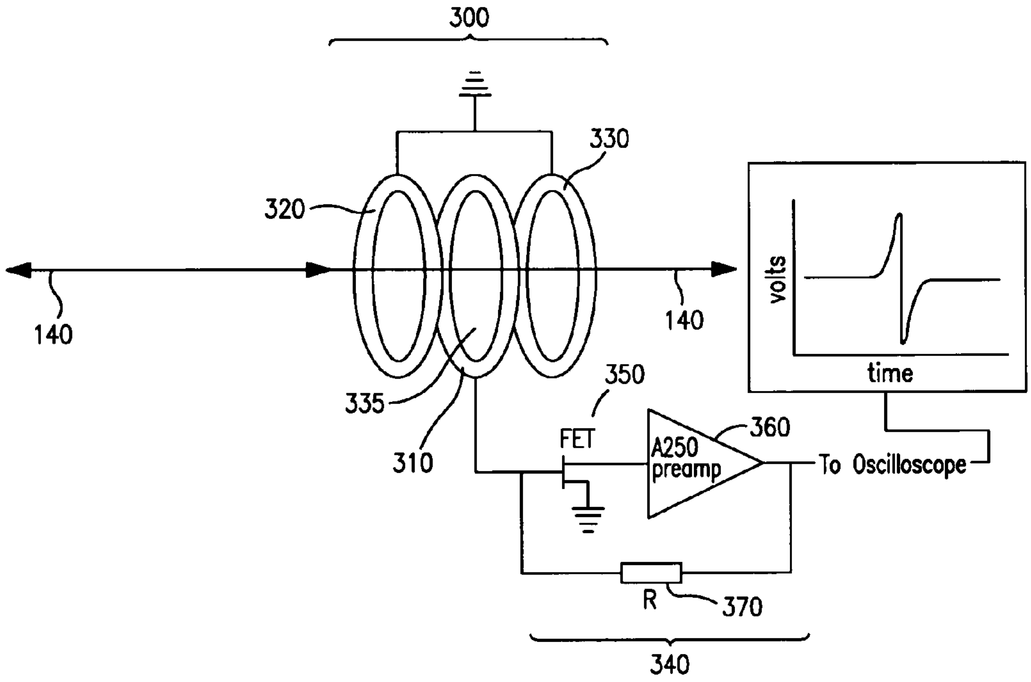
FIGS. 2A and 2B show exemplary inductive detectors of the present invention.

FIG. 2A shows an exemplary inductive detector (300) of the present invention comprising sensing electrode (310) surrounded by first shield element (320) and second shield element (330). Sensing electrode (310) is cylindrical and has an axial bore (335) concentrically positioned around the charged particle detection axis (140). Sensing electrode (310) may comprise any material having a high conductivity, such as copper. In the exemplary embodiment shown in FIG. 2A, sensing electrode is operationally connected to converter circuit (340), which comprises a field effect transistor (350), preamplifier (360) and resistor (370). Detection signals originating at the sensing electrode are processed via converter circuit (340) and stored in computer (375). The converter circuit shown in FIG. 2A is but one type of converter circuit useable in the present invention. Specifically, any convert circuit capable of receiving an input charge signal and developing a selected output signal is useable in the present invention.

First and second shield elements are maintained at an electric potential substantially close to ground and may comprise any conducting material. In the exemplary embodiment shown in FIG. 2, first and second shield elements are cylindrical and have axial bores concentrically positioned about charged detection axis (140). First and second shield elements are positioned at selected distances along the charged particle detection axis upstream and downstream of sensing electrode (310). First shield element (320) and second shield element (330) operate to minimize electric fields, magnetic fields and electromagnetic fields from sources other than the charged particles from interacting with sensing electrode (310). Optionally, insulator elements, not shown in FIG. 2A, comprising substantially non-conducting materials, such as Teflon, are located at any position between the sensing electrode and first shield element, second shield element or both. Sensing electrode and first and second shield elements may be held in position about the charged particle detection axis by fastening means well known in the art including but not limited to holders comprising a material that has a very low conductivity.

Figure 2B:
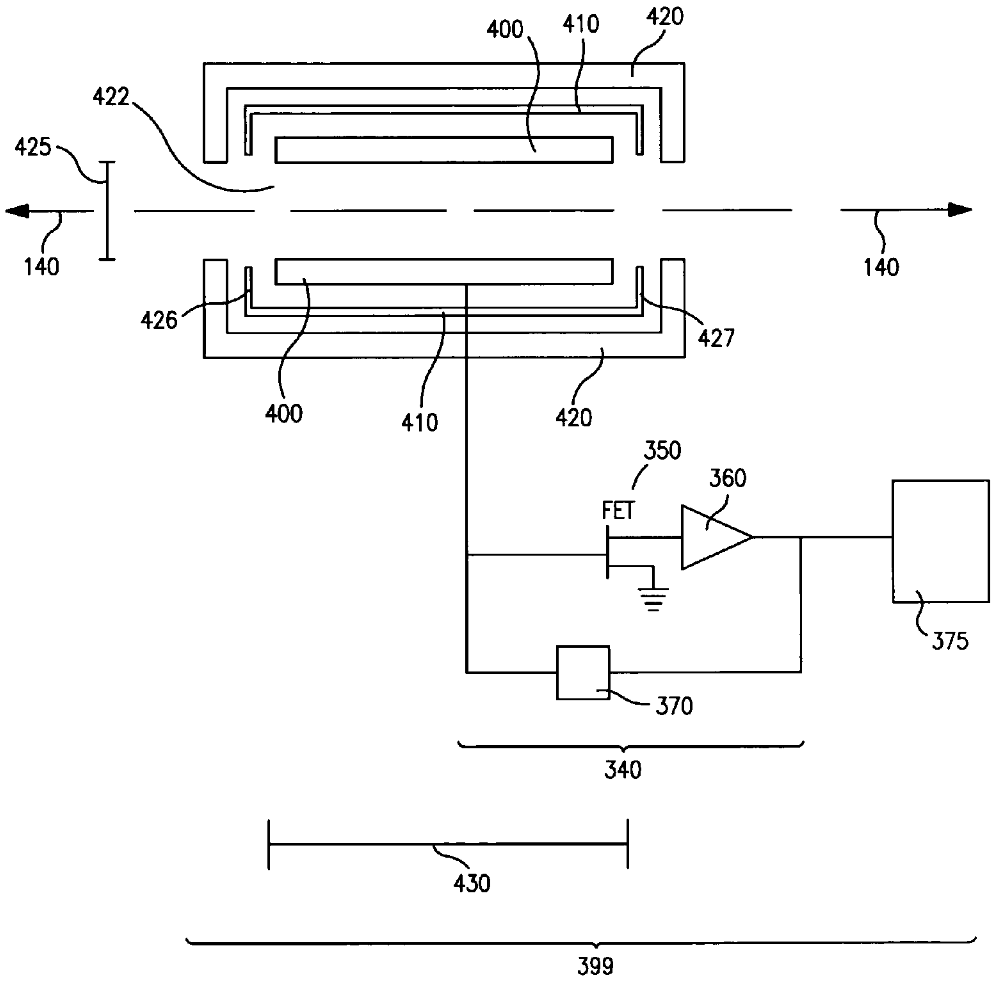

FIG. 2B shows a cross sectional view of an alternative inductive detector (399) of the present invention comprising tubular sensing electrode (400), insulator (410) and shielding cylinder (420) concentrically positioned about charge detection axis (140). Tubular sensing electrode has an axial bore (422) having diameter (425), internal end (426) and external end (427). In the exemplary embodiment shown in FIG. 2B, sensing electrode (400) is operationally connected to converter circuit (340), which comprises a field effect transistor (350), preamplifier (360) and resistor (370). Detection signals originating at the sensing electrode are processed via converter circuit (340) and stored in computer (375).

The physical dimensions of the sensing electrodes of the present invention substantially impact the detection sensitivities attainable. Inductive detectors having axial bores with smaller diameters are preferred for some applications because the magnitude of the electric charges induced on the surface of the sensing electrode increases as the spatial separation between the charged particle the detector surface decreases. Preferred axial bore diameters of the present invention, however, must be great enough to provide efficient throughput of charged particles having momentum substantially directed along the charged particle detection axis.

The noise associated with induced electric charge signals also depends on the physical dimensions of the sensing electrode, which establish the total capacitance of the sensing electrode. As the noise of an inductive detector of the present invention is proportional to the capacitance of the sensing electrode, electrode arrangements having low capacitance are preferred. The capacitance of coaxial cylinders is determined by the following equation:

$$C = \frac{2\pi\varepsilon_o L}{\ln\left(\frac{b}{a}\right)} \quad \text{(III)}$$

where L defines the length of the cylinders, b is the radius of the shielding cylinder and a is the radius of the sensing electrode. Therefore, reduced noise and greater sensitivity may be achieved by employing small axial bore diameters and lengths providing axial bores having small surface areas. Sensing electrodes having minimized capacitance is also beneficial because it provides a smaller RC time coefficient for the detector arrangement. Smaller RC time coefficients are beneficial because they ensure that the temporal profile of the induced electric charge reflects the motion of the charged particle past the detector rather than reflecting the RC time constant of the detector arrangement.

In a preferred exemplary embodiment, tubular sensing electrode has length (430) of about 4 mm and an axial bore diameter of about 2 mm and the steel shielding tube extends about 2 mm past each end of the electrode along the charged particle detection axis. This preferred exemplary inductive detector design provides a detection sensitivity of about 10 elemental charge units, which is more than an order of magnitude improvement to the inductive detector designs of the prior art.

Detector noise in the present invention may also be reduced by using multiple detection via a series of inductive detectors positioned along the charged particle detection axis. Specifically, use of multiple inductive detectors provides an output comprising a periodic signal. The functionality of such a periodic signal may be used to accurately discriminate between the signal component relating to the charged particle trajectory and nonrandom noise signal components.

Figure 3A:
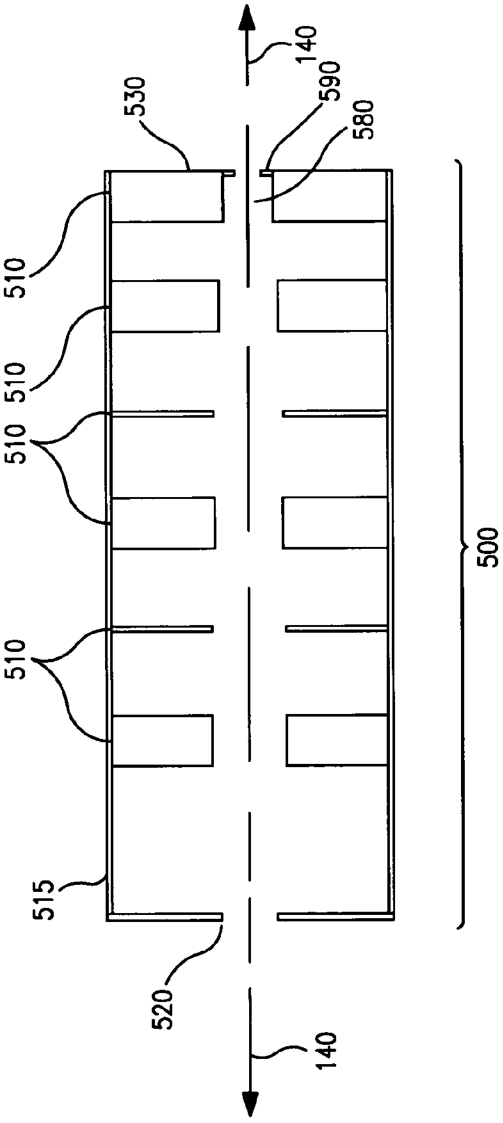
FIG. 3A is a schematic drawing of a cross sectional view of an exemplary aerodynamic ion lens for providing a spatially collimated beam of charged particles or packets of charged particles.

FIG. 3A is a schematic diagram of a preferred charged particle collimator of the present invention comprising an aerodynamic ion lens system (500). Exemplary aerodynamic ion lens system comprises apertures (510) in tubular housing (515). The apertures are positioned selected distances from one another and are concentrically positioned about charged particle detection axis (140). To operate as charged particle collimator, charged particles and a flow of bath gas are introduced to the lens system via internal end (520), flow past apertures (510) and leave the lens system via external end (530). The flow of gas through aerodynamic ion lens system (500) focuses the spatial distribution of charged particles about charged particle detection axis (140). In a preferred embodiment, charged particles exit the aerodynamic ion lens system (500) having a momentum substantially directed along charged particle detection axis (140). In a more preferred embodiment, charged particles exit the aerodynamic ion lens system (500) having well-defined, substantially uniform trajectories.

Figure 3B:
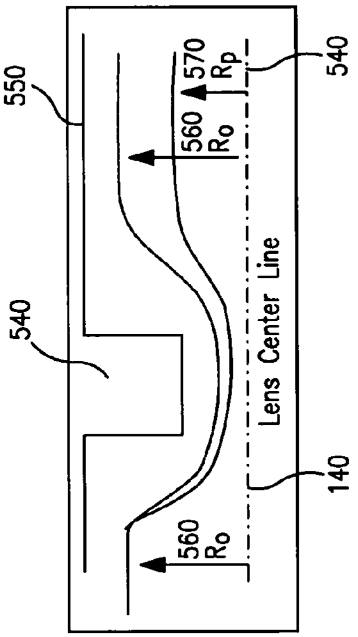
FIG. 3B is a schematic drawing of an aerodynamic lens showing laminar flow (the laminar flow streamline is the dashed line) and the resultant charged particle trajectory (solid line) through the aerodynamic lens.

The aerodynamic ion lens of the present invention is an axisymmetric device which first contracts a laminar flow and then lets the laminar flow expand. FIG. 3B shows a cross sectional longitudinal view of an aerodynamic ion lens system comprising a single aperture (540) placed inside a tube (550), which illustrates the fluid mechanics involved in focusing a stream of charged particles about charged particle detection axis (140). In steady laminar flow, a fluid streamline entering the lens at a radial distance of (560), wherein radial distance (560)>constriction aperture radius, will compress to pass through aperture (540) and then return to its original radial position (560) at some point downstream of aperture (540). A charge particle or plurality of charged particles, which enters along this same streamline, will have the same initial starting radius (560). However, due to inertial effects, the particle will not follow the streamline perfectly as it contracts to pass through aperture (540). As a result, down stream of aperture (540) the particle will not return to it initial radial position (560), but instead to some radius (570) which is less than (560). By placing multiple apertures in series it is possible to move or focus the particle arbitrarily close (depending on the number of lenses employed) to charged particle detection axis (140). Contraction factor $\eta$, defined as: the ratio of these two radii (570/560), characterizes the degree of focusing achieved by the aerodynamic ion lens system. $\eta$ is a function of the gas properties which make up the fluid flow, the shape and number of the apertures employed and the aerodynamic size and mass of the particles in the fluid stream. Using an electrospray scanning mobility particle sizer electrophoretic mobility diameters were obtained for single stranded DNA molecules in air (−1 charge state). The diameter of a 20 mer DNA molecule was measured to be ~0.003 μm while the diameter obtained for a 111 mer DNA was ~0.005 μm.

In the exemplary embodiment depicted in FIG. 3A, the aerodynamic ion lens system of the present invention comprises five separate apertures (510) housed in a tubular housing (550). Specifically, the aerodynamic ion lens system of this exemplary embodiment comprises five apertures positioned along charged particle detection axis (140) and contained within a tubular housing approximately 10 mm in diameter. Each aperture is separated from each other by a distance of 50 mm, as measured from the center of one aperture to an adjacent aperture. Starting with a width of 10 mm at the internal end, the apertures alternate between a width of 0.5 mm and a width of 10 mm along the ion production axis. From internal to external end, the aperture diameter decreases sequentially from 5.0 mm to 4.5 mm to 4.0 mm to 3.75 mm to and 3.5 mm. A modified thin-plate-orifice nozzle, comprising an about 6 mm in diameter cylindrical opening (580), about 10 mm long, leading to a thin-plate aperture (590) about 3 mm in diameter, is cooperatively connected to the external end of the aerodynamic ion lens system. Optionally, a bleeder valve (not shown) may be cooperatively connected to the internal end of the aerodynamic lens stack to adjust the flow rate and flow characteristics of the bath gas, electrically charged particles through the aerodynamic lens.

Aerodynamic ion lens systems of the present invention may be maintained at a substantially constant pressure. Alternatively, aerodynamic ion lens systems of the present invention may have a selected pressure gradient along the charged particle detection axis. Aerodynamic ion lens systems of the present invention include embodiments having differential pumping. For example in a preferred embodiment, the internal end (520) is maintained at a pressure of about one atmosphere and the external end (530) is maintained at a pressure of about $1\times10^{-3}$ Torr. Accordingly, aerodynamic lens systems of the present invention provide an efficient interface from a high pressure ion formation region, such as an ESI or MALDI ion source region, and a low pressure charged particle analysis and detection region.

In a preferred embodiment, electric fields, magnetic fields and electromagnetic fields in the aerodynamic ion lens systems originating from sources other than the charged particles are minimized. Minimizing the presence of electric fields, magnetic fields and electromagnetic fields is beneficial for preserving the substantially uniform, well defined flight paths of charged particles having momentum substantially directed along the charged particle detection axis. In addition, the aerodynamic ion lens system of the present invention is a preferred charged particle collimator because it does not employ electrostatic focusing which exhibit significant mass-to-charge ratio biasing.

Charged particle collimators of the present invention are capable of providing a spatially collimated beam of individual charged particles or packets of charged particles having momentum substantially directed along a charged particle detection axis to a particle analysis and detection region. In a preferred embodiment, the trajectories of charged particles and packets of charged particles translating through the analysis and detection region are substantially uniform. The term "momentum substantially directed" is intended to encompass some deviation from trajectories absolutely parallel to the defining charged particle detection axis. The deviations from absolute parallelism comprise a cone of angles deviating from the defining axis. It is preferable for many applications of the present invention that deviations from the defining axis are minimized. In a preferred embodiment, deviations of charged particle trajectories from the charged particle detection axis are 500 milliradians or less. It is more preferred in some applications that the deviations of charged particle trajectories from the charged particle detection axis are 10 milliradians or less. It is most preferred for some applications that the deviations of charged particle trajectories from the charged particle detection axis are 0.5 milliradians or less.

Figure 4A:
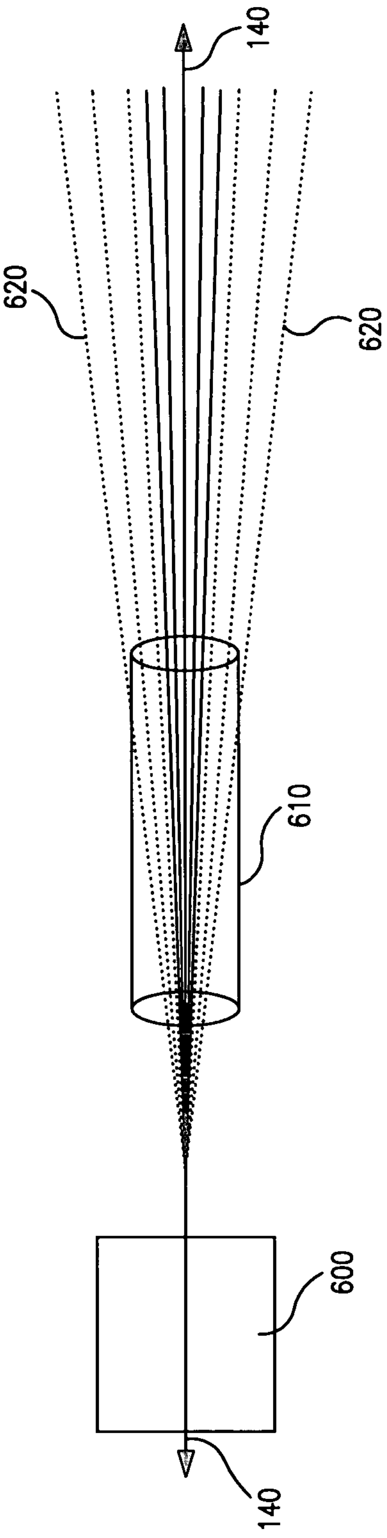
FIG. 4A is a schematic drawing of charged particle trajectories from a charged particle collimator through a tubular inductive detector.
Figure 4B:
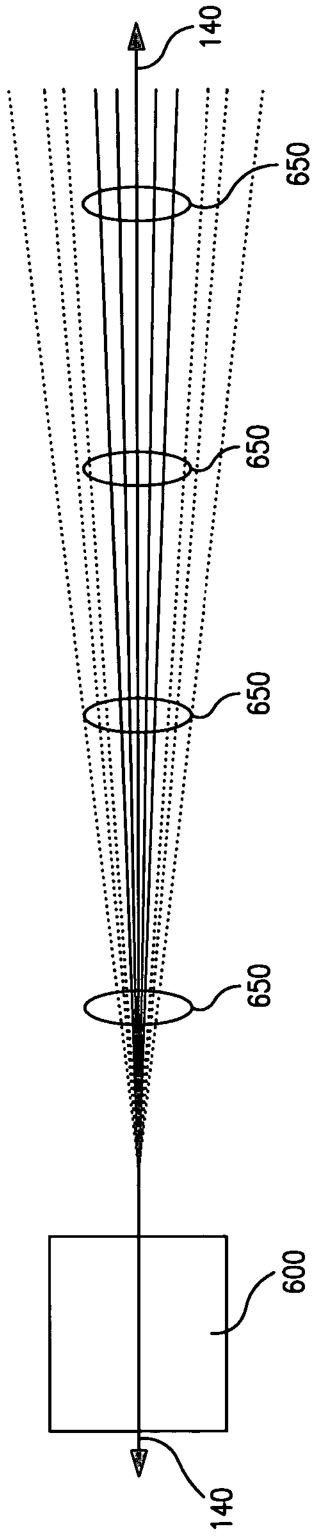
FIG. 4B is a schematic drawing of charged particle trajectories from a charged particle collimator through a plurality of inductive detectors. The dotted lines represent trajectories having high degrees of deviations from a trajectory absolutely parallel to the charged particle detection axis. The solid lines represent trajectories of charged particles having momentum substantially directed along the charged particle detection axis.

The importance of uniform charge particle trajectories of charged particles having momentum substantially directed along the charged particle detection axis for achieving efficient and sensitive detection via a single inductive detector or series of inductive detectors is illustrated in FIGS. 4A and 4B. FIG. 4A shows a plurality of charged particle trajectories from charged particle collimator (600) through a tubular inductive detector (610) that deviate from absolute parallelism with respect to charged particle detection axis (140). The dotted lines represent trajectories having high degrees of deviations from a trajectory absolutely parallel to the charged particle detection axis. The solid lines represent trajectories of charged particles having momentum substantially directed along the charged particle detection axis. In the present invention, charged particles having momentum substantially directed along the charged particle detection axis are preferred. First, as shown in FIG. 4, charged particle trajectories (620) exhibiting very high deviations from absolute parallelism intersect the walls of the inductive detector. Charged particles translating such trajectories will likely be lost at some unknown point during passage through the tubular detector due to collision with the walls and, therefore, the velocities of such particles may not be accurately determined.

Second, the charged particle trajectories shown in FIG. 4A correspond to a distribution of flight paths through tubular inductive detector (610). Specifically, charged particles having trajectories with high degrees of deviations from absolute parallelism have longer path through the detector than trajectories closer to absolute parallelism. In an exemplary embodiment, the flight path of an individual particle through inductive detector (610) is not measured directly but assumed to be equal to the length (630) that the detector extends along the charged particle detection axis (140). Therefore, the distribution of actual flight paths of the charged particles analyzed introduces uncertainty into the measurement of particle velocity. Importantly, charged particles having momentum substantially directed along the charged particle detection axis exhibit a relatively narrow distribution of flight paths through inductive detector (610), thereby, substantially reducing the uncertainty in the determination of individual particle velocities.

Finally, analysis of a charged particle source having a narrow distribution of flights paths allows for the construction of inductive detectors having axial bores with smaller diameters. Use of smaller diameter axial bores provides inductive detectors with improved sensitivity because the magnitude of the induced electric charge is proportional to the proximity of the particle to the detector surface. Further, use of smaller diameter axial bores provides an inductive detector having a smaller capacitance, which reduces the noise associated with the detector and enhances sensitivity.

FIG. 4B also illustrates another important aspect of the spatially collimated charged particle sources of the present invention. FIG. 4B shows a plurality of charged particle trajectories, which deviate from absolute parallelism with respect to charged particle detection axis (140). A variety of charged particle trajectories are shown from charged particle collimator (600) through a plurality of inductive detectors (650) positioned sequentially along the charged particle detection axis. The dotted lines represent trajectories having high degrees of deviations from a trajectory absolutely parallel to the charged particle detection axis. The solid lines represent trajectories of charged particles having momentum substantially directed along the charged particle detection axis. As illustrated by FIG. 4B, the use of spatially collimated sources of charged particles having momentum substantially directed along the charged particle detection axis provides efficient multiple charged particle analysis and detection. Specifically, charged particles with trajectories having high degrees of deviations from a trajectory absolutely parallel to the charged particle detection axis (the dotted lines) do not pass through all four inductive detectors sequentially positioned along charged particle detection axis (140). Therefore, particles having these trajectories will be lost in the detection and analysis region. In contrast, charged particles having momentum substantially directed along the charged particle detection axis are able to pass through the axial bore of all four detectors and be non-destructively detected. Importantly, the trajectories of these charged particles allows for multiple inductive detection over relatively long charged particle flight paths, which provides for high resolution measurements.

Figure 5:
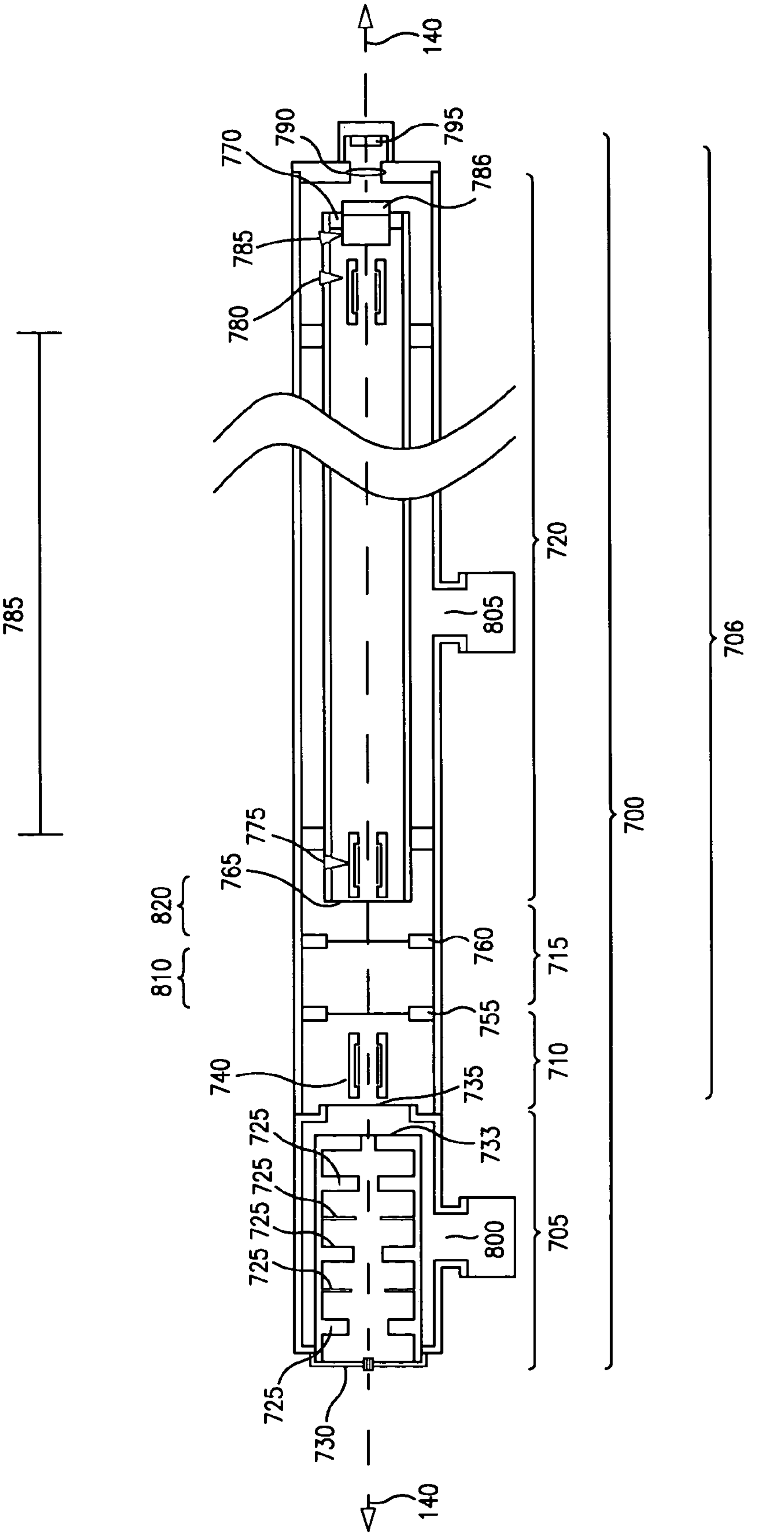
FIG. 5 is a schematic drawing showing a top plan view of an exemplary device for analyzing the mass-to-charged ratios of charged particles. The exemplary device shown in FIG. 5 may also be configured to determine absolute masses of charged particles.

FIG. 5 is a schematic diagram of an exemplary embodiment of the methods and devices of the present invention for analyzing the mass-to-charge ratios of electrically charged particles. The illustrated charged particle analyzer (700) comprises aerodynamic ion lens system (705) in fluid communication with charged particle analysis and detection region (706). In the exemplary embodiment shown in FIG. 5, charged particle analysis and detection region (706) comprises pre-acceleration region (710), charged particle acceleration region (715), and flight tube (720). Aerodynamic ion lens system (705) comprises a plurality of apertures (725) concentrically positioned about charged particle detection axis (140) and has external end (730) and internal end (733). Aerodynamic ion lens system (705) is operationally coupled to pre-acceleration region (710), preferably by skimmer (735). First inductive detector (740) is located in pre-acceleration region (710) and is positioned a selected distance from internal end (733). First inductive detector comprises a sensing tube having an axial bore concentrically positioned about the charged particle detection axis and preferably at least one shield element. At least one charged particle accelerator is positioned in charged particle acceleration region (715) comprising first stage extraction region (810) and second stage extraction region (820). In the exemplary embodiment shown in FIG. 5, first electrode (755) and second electrode (760), capable of generating a selected electric potential difference, are positioned at selected first and second distances from first inductive detector (740). Flight tube (720) has a selected length, is concentrically positioned about charged particle detection axis (140) and is positioned adjacent to charged particle acceleration region (715). In the exemplary embodiment shown in FIG. 5, flight tube (720) has external end (765) located a selected distance from charged particle acceleration region (715) and an internal end (770). Preferred flight tubes (720) have lengths extending along the charged particle detection axis selected over the range of about 20 cm to about 5 meters. Second inductive detector (775) is positioned a selected distance from internal end (765) of flight tube (720) and comprises a sensing tube having an axial bore concentrically positioned about the charged particle detection axis and preferably at least one shield element. Third inductive detector (780) is positioned a selected flight path (785) from second inductive detector (775) and comprises a sensing tube having an axial bore concentrically positioned about the charged particle detection axis and preferably at least one shield element.

Optionally, the methods and devices of the present invention for analyzing the mass-to-charge ratios of electrically charged particles may include additional charged particle detectors located throughout charged particle analysis and detection region (706). In the preferred embodiment shown in FIG. 5, MCP detector (785), phosphor screen (786), lens (790) and photodetector (795) are positioned at external end (770) of flight tube (720). In an alternative preferred embodiment, additional inductive detectors are positioned in pre-acceleration region (710), throughout flight tube (720) or both. In another alternate embodiment, a faraday cup style detector read out by radio-frequency single electron transistors, single electron transistors, cryogenic high electron mobility transistors and micro-cantilever is positioned in flight tube (720). Further, the methods and devices of the present invention for analyzing the mass-to-charge ratios of electrically charged particles may include one or more differential pumping stages. For example, first differential pumping stage (800) may be located in the aerodynamic ion lens system (705) and second differential pumping stage (805) may be located in charged particle analysis and detection region (706).

Charged particles are introduced with a flow of bath gas to aerodynamic ion lens system (705) through external end (730), pass through apertures (725) and exit internal end (733) having momenta substantially directed along charged particle detection axis (140). In the exemplary embodiment shown in FIG. 5, the aerodynamic ion lens system is differentially pumped via differentially pumping stage (800), which provides a pressure ranging from 0.1 Torr to about 0.01 Torr in the aerodynamic ions lens system. In a preferred embodiment, individual charged particles or packet of charged particles, which are spatially and temporally separated are introduced into external end (730) of aerodynamic ion lens system (705). Preferred charged particles in the present invention include but are not limited to gas phase ions, molecular and ionic aggregates having an associated electric charge, electrically charged particles, and mixtures of these charged particles. In an exemplary embodiment, electrically charged droplets are introduced into external end (730) and undergo desolvation, evaporation or both, thereby generating gas phase ions in the aerodynamic ion lens system via field desorption, complete desolvation or both. In this embodiment, a spatially collimated stream of gas phase ions exit external end (733) having a momentum substantially directed along charged particle detection axis (140).

The stream of charged particles having momenta substantially directed along charged particle detection axis (140) passes through skimmer (733) into a low pressure pre-acceleration region, preferably at a pressure less than $1\times10^{-5}$ Torr. In the pre-acceleration region, individual particles or packets of particles in the stream induce electric charges on the surface of first inductive detector (740). Particle streams comprising spatially and temporally separated charged particles or packets of charged particles are preferred in the present invention to ensure that observed temporal profiles correspond to a single charged particle or packet of charged particles. The temporal profiles of induced electric charges generated by first inductive detector (740) are used to determine the velocity of each charged particle or packet of charged particles passing through pre-acceleration region (710). Optionally, additional inductive detectors may be positioned at selected points along the charged particle detection axis in the pre-acceleration region to monitor the change in velocity of charged particles or packets of charged particles.

Charged particles or packets of charged particles exit the pre-acceleration region and are accelerated in the acceleration region (710). In a preferred embodiment, the induced electric charge generated by first inductive detector is used to trigger charged particle acceleration via a two stage, pulsed extraction method, preferably delayed extraction. In this process, the charged particles enter a first stage extraction region (810) while the potential difference between first electrode (755) and second electrode (760) is substantially close to zero. In a preferred embodiment, first stage extraction (810) region extends approximately 4 cm along charged particle detection axis (140). At a selected time later, the charged particles are extracted by a low-voltage, draw-out pulse generated by first and second electrodes in the first stage extraction region. Charged particles present in the portion of the first stage extraction region (810) closer to the pre-acceleration region receive more energy that those present in the portion of first stage extraction region (810) closer to the post-acceleration region. Next, particles enter the second stage extraction region (820), wherein they are accelerated to their final energies and enter flight (720). In a preferred embodiment, second stage extraction region (820) extends approximately 1 cm along charged particle detection axis (140).

In a preferred embodiment, high acceleration voltages (>4 kV) are employed to accelerate the charged particles. In an exemplary embodiment, an acceleration voltage of selected from the range of 10–50 kV is applied to the electrodes. Use of high acceleration voltages is desirable because it minimizes the degradation of the resolution attained due to deviations in the pre-acceleration spread of ion kinetic energies. In addition, high acceleration voltages are preferred because they provide higher post-acceleration kinetic energies that result in increased detection efficiency of microchannel plate (MCP) detector (785) located at the end of flight tube (720). Further, high acceleration voltages are beneficial because they ultimately result in improved resolution, especially when combined with large flight tube path lengths.

The accelerated charged particles and packets of charged particles enter flight tube (720) and induce electric charges on the surface of second inductive detector (775). In a preferred embodiment, flight tube (720) is substantially free of electric fields generated by sources other than the charged particles or packets of charged particles and is maintained at a pressure less than or equal to $1\times10^{-5}$ Torr. In addition, flight tubes having long flight paths along charged particle detection axis (e.g. >1 meter) are preferred because they provide a high degree of m/z separation. Optionally, flight tube (720) may include a reflectron, not shown, to increase the effective charge particle flight path and improve mass resolution.

Charged particles translated through flight tube (720) and the arrival of charged particles at the end of the flight tube is detected by the electric charges induced on the surface of third inductive detector (780). Although all gas phase ions receive the same kinetic energy upon entering the flight tube, they translate across the length of the flight tube with a velocity inversely proportional to their individual mass to charge ratios (m/z). Lighter ions that have higher velocities reach the end of flight tube (720) first and heavier ion with lower velocities arrive at later times. The flight time through flight tube (720) may be expressed by the equation:

$$T = (l)\left(\frac{M}{2qV}\right)\frac{1}{2} \tag{IV}$$

where T is the flight time, 1 is the length of the flight tube (785), V is the potential difference across the acceleration region, M is the mass of the charged particle and q is the charge state. Accordingly, the arrival times of charged particles at the end of the flight tube may be used to measure mass-to-charge ratio. Optionally, first, second and third inductive detectors may be configured to provide measurements of charged state, thereby, providing the ability to characterize the a particle's absolute mass.

In the exemplary embodiment shown in FIG. 5, MCP detector (785) is positioned such that charged particles collide with the detector surface upon passing by third inductive detector (780). Electrons are generated in a microchannel cascade initiated by the impact of a charged particle with the microchannel plate detector (785) and transfer their energy to a phosphor screen (786) causing it to emit photons. These photons are focused by lens (790) and imaged onto the face of a photodetector (795) referenced to ground. The flight time is then marked by the generation of a signal at the photodetector. By noting the time difference between the application of the potential difference between the acceleration electrodes and the arrival of the particle at the MCP detector a measurement of flight time is obtained.

In an exemplary embodiment, a spatially collimated source of individual electrically charged particles or discrete packets of electrically charged particles is generated by ESI or MALDI techniques. Preferred charged particle sources comprise pulsed ESI, ESI droplet on demand sources and MALDI sources that provide spatially and temporally separated electrically charged particles or packets of electrically charged particles. Sufficient separation is essential to ensure that the accelerated ions or packets of ions in the time-of-flight analysis are sufficiently temporally separated with adequate spatial separation to avoid overlap of consecutive mass spectra. Pulsed electrically charged particle sources are preferred because they are compatible with on axis time-of-flight analysis techniques, wherein ions translate flight paths that are substantially parallel to the ion formation axis. Moreover, pulse ion sources may be precisely synchronized with the acceleration pulse of the time-of-flight analyzer, providing for detection efficiency independent of the duty cycle of the TOF mass analyzer. Continuous ESI sources, however, may be employed using pulsed orthogonal extraction methods well known in the art.

All references cited in this application are hereby incorporated in their entireties by reference herein to the extent that they are not inconsistent with the disclosure in this application. It will be apparent to one of ordinary skill in the art that methods, devices, device elements, materials, procedures and techniques other than those specifically described herein can be applied to the practice of the invention as broadly disclosed herein without resort to undue experimentation. All art-known functional equivalents of methods, devices, device elements, materials, procedures and techniques specifically described herein are intended to be encompassed by this invention.

EXAMPLE 1

Non-destructive, Inductive Detection of Polypeptides and Oligonucleotides

The use of the present invention for the analysis and detection of biopolymers was tested by analyzing liquid samples containing known quantities of polypeptide and oligonucleotide analytes. The ability of the present invention to analyze and detect charged particles generated from biopolymers without destroying them or substantially altering their trajectories was evaluated. Further, the independence of the sensitivity of the inductive detectors of the present invention with respect to gas phase ion velocity was directly confirmed.

Gas phase ions from liquid samples containing known quantities of polypeptide and oligonucleotide analytes were generated using a MALDI ion source and subsequently analyzed by a linear time-of-flight analyzer. Gas phase ions were generated upon illumination of a sample containing analyte by a short (≈10 ns) laser pulse, accelerated by an ion accelerator and passed through a time-of-flight mass separation region. Upon translating through the mass separation region, gas phase ions were sequentially analyzed by an inductive detector and MCP detector positioned at the end of the ion flight path. The inductive detector was positioned a short distance up stream of the MCP detector, with respect to the passage of gas phase ions through the mass separation region. This detector arrangement, allowed for direct evaluation of the ability of the inductive detectors of present invention to analyze gas phase ions without destroying them or substantially disrupting their trajectory through the mass separation region.

The inductive detector employed in these studies comprises a 3.81 cm long tubular sensing electrode made of copper and having an axial bore with an inner diameter of 0.64 cm. The tube is supported with a Teflon insulator inside a stainless steel shielding cylinder. Ions pass through the axial bore of the detector and their electric field generates induced charges on the inner surface of the copper tube. The induced signal is converted to a voltage output by an A250 charge sensitive preamplifier implanted on a PC250 circuit board (Amptek Inc., Bedford, Mass.). The preamplifier is operated in current mode, and a feedback resistance of 1 MΩ is used. By applying a short current pulse to the inductive detector, the rise time and fall time of the preamplifier output was observed to be about 250 ns. The circuit is shielded by a stainless steel box and placed close to the charge detector inside the time-of-flight mass separation region held at a low pressure to prevent signal loss. The output of the preamplifier is directly connect to a Tektronix oscilloscope. Input impedance of the oscilloscope was set at 1 MΩ to match the output of the A250 preamplifier.

The MCP detector is in chevron configuration and placed approximately 4 cm downstream of the inductive detector, with respect to the passage of gas phase ions through the mass separation region. The MCP active area is a circle 2.54 cm in diameter. Accordingly, the detector arrangement employed allowed all the ions passing through the 0.64 cm diameter axial bore of the inductive detector to reach the MCP active area. Typically, the MCP was operated in saturation mode with 1 kV applied across each one of the two plates. The output from the metal anode of the MCP detector was directly coupled to an oscilloscope.

The response from both detectors are digitized and processed off-line. Time-of-flight spectra were acquired at acceleration voltages of 5 kV, 10 kV, 15 kV and 25 kV in negative-ion mode for DNA and positive mode for proteins. All spectra were obtained by averaging more than 50 laser shots.

Figure 6A:
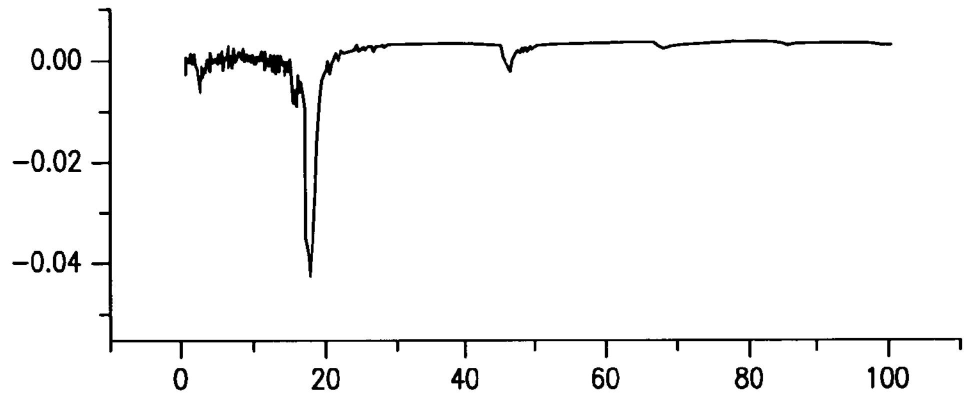
FIGS. 6A and 6B shows spectra acquired in the time-of-flight analysis of an insulin (Mass=5734 Da) sample prepared in a 100 μM water.
Figure 6B:
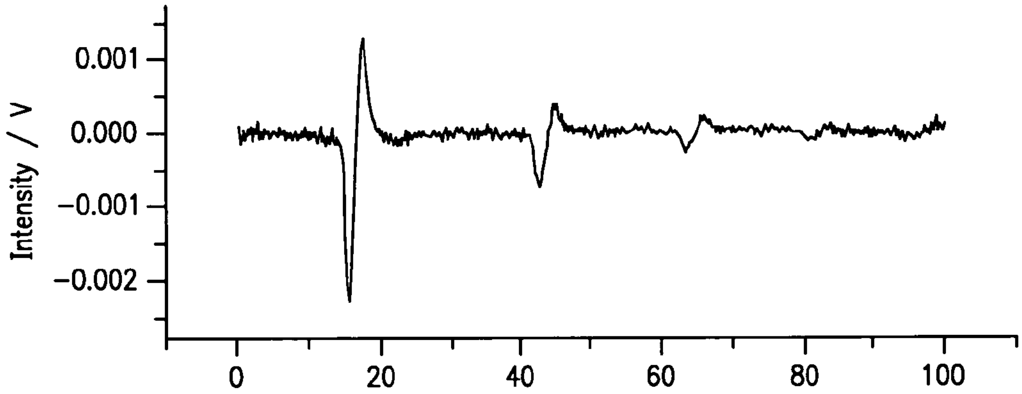

FIGS. 6A and 6B shows spectra acquired in the time-of-flight analysis of an insulin (Mass=5734 Da) sample prepared in a ~100 μM water solution using an acceleration voltage of 25 kV. FIG. 6A shows the time-of-flight spectrum acquired by the MCP detector and FIG. 6B shows the time-of-flight spectrum acquired by the inductive detector. The series of peaks shown in FIGS. 6A and 6B correspond to $[M+H]^+$, $[2M+H]^+$, $[3M+H]^+$, $[4M+H]^+$ and $[5M+H]^+$, wherein M indicates insulin.

The relatively high detector signals shown in FIG. 6A, indicate that the majority of the polypeptides analyzed by the inductive detector were subsequently detected by the MCP detector. This illustrates that inductive detectors of the present invention are able to analyze ions generated from peptides without consuming them or substantially affecting their trajectories through the mass separation region. Spectra were also acquired for at acceleration voltages of 5 kV, 10 kV, and 15 kV. Lower acceleration voltages provide lower gas phase ion velocities in the time-of-flight mass separation region. While the sensitivity of the MCP detector exhibited a linear dependence on polypeptide ion velocity, the sensitivity of the inductive detector was observed to be independent of polypeptide ion velocity.

Figure 7A:
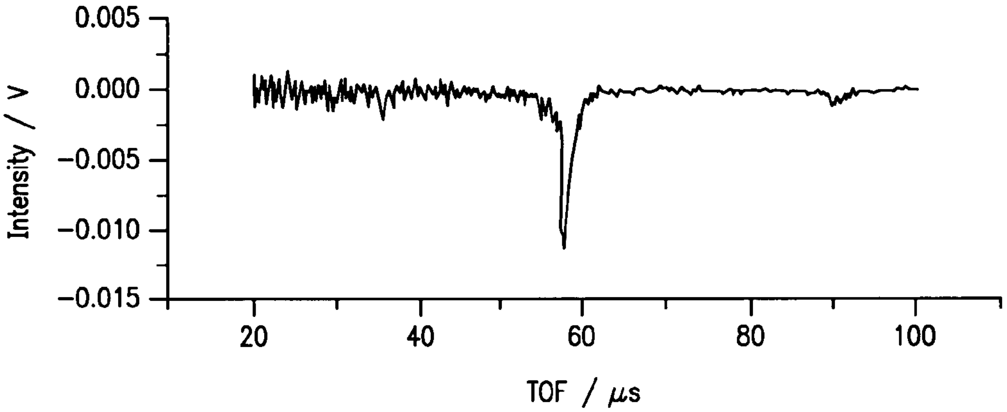
FIGS. 7A and 7B shows spectra acquired in the time-of-flight analysis of a 25-mer oligonucleotide $(dT)_{25}$ (Mass=7553 Da) sample prepared in a 100 μM water solution.
Figure 7B:
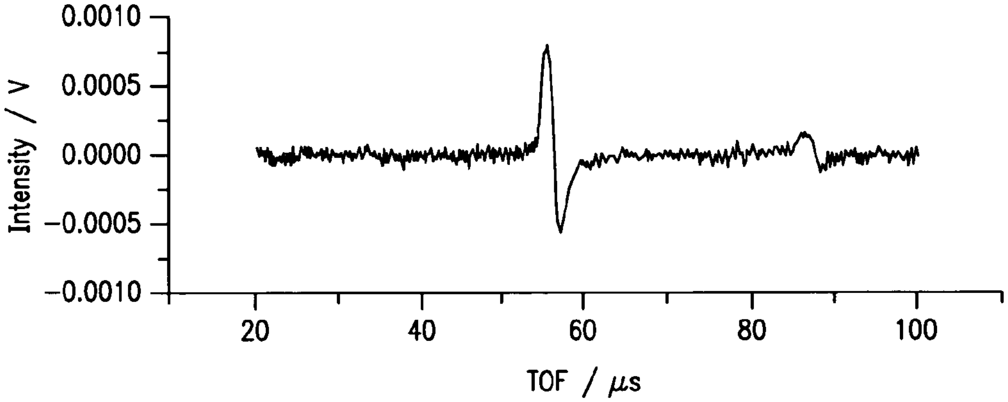

FIGS. 7A and 7B shows spectra acquired in the time-of-flight analysis of a 25-mer oligonucleotide $(dT)_{25}$ (Mass=7553 Da) sample prepared in a 100 μm water solution using an acceleration voltage of 25 kV. FIG. 7A shows the time-of-flight spectrum acquired by the MCP detector and FIG. 7B shows the time-of-flight spectrum acquired by the inductive detector. The peaks shown in FIGS. 7A and 7B correspond to singly charged $(dT)_{25}$ and its singly charged dimer. The relatively high detector signals shown in FIG. 7A, indicate that the majority of the oligonucleotides analyzed by the inductive detector were subsequently detected by the MCP detector. This illustrates that inductive detectors of the present invention are able to analyze ions generated from oligonucelotides without consuming them or substantially affecting their trajectories through the mass separation region. Spectra were also acquired for at acceleration voltages of 5 kV, 10 kV, and 15 kV, corresponding to lower gas phase ion velocities. While the sensitivity of the MCP detector exhibited a linear dependence on oligonucleotide ion velocity, the sensitivity of the inductive detector was observed to be independent of polypeptide ion velocity.

EXAMPLE 2

Ion Detection in Coincidence

The ability of the present invention to provide ion detection in coincidence was evaluated by analyzing liquid samples containing known quantities of polypeptide analytes using two inductive detectors sequentially positioned along the charged particle detection axis. The coincidence measurements confirm the ability of the inductive detectors to sensitively detect packets of ions without destroying them. In addition, the measurements show that the present invention is capable of efficient multiple detection of packets of ions.

Ions from polypeptide analytes were generated using a MALDI source and accelerated by an electrostatic potential applied by an electrode. A portion of the ions accelerated were sampled by an aperture positioned approximately 10 cm from the ion source. Upon translating through the sampling aperture, the ions were conducted through an analysis and detection region, wherein the ions passed through the axial bore of a first inductive detector, translated through a 0.4 m flight path and passed through the axial bore of a second inductive detector. The distance of the sampling aperture from the MALDI ion source was great enough to ensure generation of a collimated beam of ions for passage through the analysis and detection region. An acceleration voltage of 25000 V was used in all experiments.

Figure 8A:
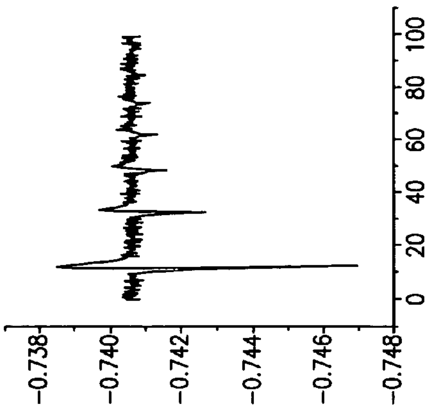
FIGS. 8A–F show temporal profiles of electric charges induced on the first detector (8A, 8C and 8E) and the second detector (8B, 8D, 8F) acquired upon the MADLI ionization various peptide-containing solutions.
Figure 8B:
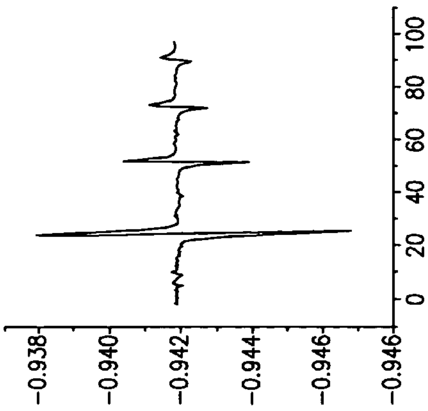
Figure 8C:
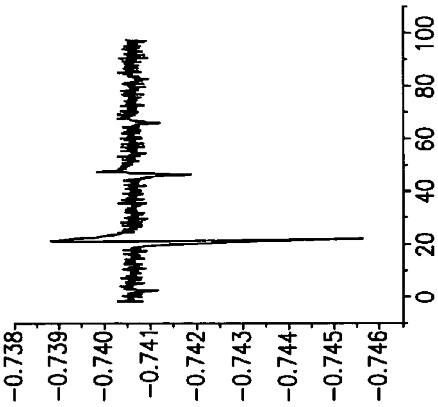
Figure 8D:
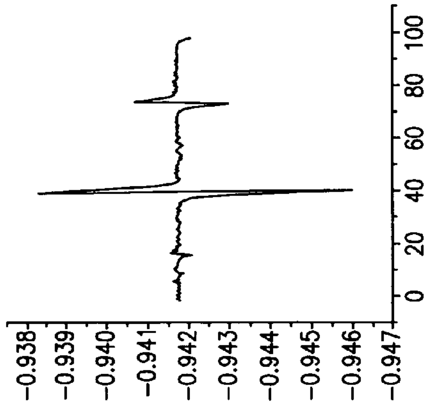
Figure 8E:
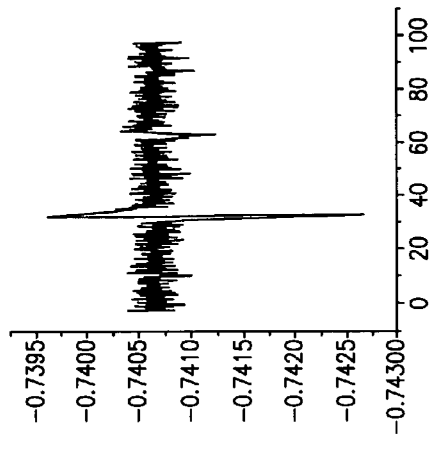

FIGS. 8A–F show temporal profiles of electric charges induced on the first detector (8A, 8C and 8E) and the second detector (8B, 8D, 8F) acquired upon the MADLI ionization of various peptide-containing samples. FIGS. 8A and 8B correspond to the MALDI ionization of a sample derived from a 1 mM solution of insulin in water. FIGS. 8C and 8D correspond to the MALDI ionization of a sample derived from a 500 μM solution of ubiquitin in water. FIGS. 8C and 8D correspond to the MALDI ionization of a sample derived from a 800 μM solution of cytochrome c in water.

Figure 8F:
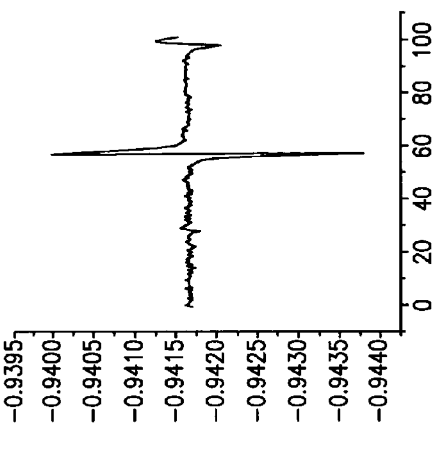
Figure 9:
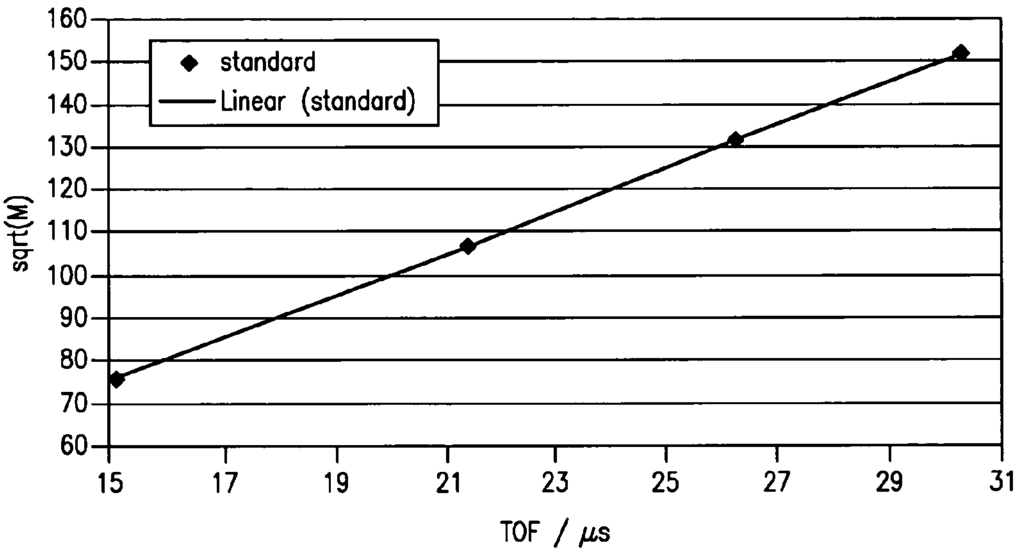
FIG. 9 is a plot of the square root of molecular mass verse flight time measured by a pair of inductive detectors for various peptide-containing solutions. The linearity of the curve shown in FIG. 9 demonstrates that flight time may be easily related to molecular mass.

Flight times for the various polypeptide samples analyzed were obtained by subtracting the times associated with the negative peaks of the temporal profiles obtained by first and second detectors. As shown in FIGS. 8A and 8F, peptides having higher molecular masses exhibited longer flight times between first and second detectors than peptides with small molecular mass. FIG. 9 shows a plot of molecular mass verse observed flight time. The linear relationships shown in FIG. 9 may be quantitatively described by the following equation:

$$\sqrt{\frac{m}{z}} = \frac{\sqrt{2eV}}{L}\Delta t \qquad \text{(V)}$$

wherein m is the molecular mass, z is the charge state, e is the absolute charge of an electron ($1.60\times10^{-19}$ C), V is the acceleration voltage, At is the difference between the response times of the two detectors. The high degree of linearity of the curve shown in FIG. 9 confirms that flight times measured by the detector pair may be easily related to mass-to-charge ratio.

Table I shows calibration data comprising predicted and observed mass using the methods of ion detection in coincidence of the present invention. As shown in Table I, the methods of the present invention are capable of accurately determining the mass of charge particles.

TABLE I

External Calibration Data.

| Predicted Mass | Observed Mass | Error (%) |
|---|---|---|
| 5734.6 | 5739.7 | 0.09 |
| 8565.9 | 8498.1 | 0.79 |
| 11468 | 11403 | 0.57 |
| 17131 | 17191 | 0.35 |
| 17202 | 17244 | 0.24 |
| 22935 | 23044 | 0.47 |

EXAMPLE 3

Time-of-Flight Measurements Using a Fully Shielded Inductive Detector

In another aspect, the present invention comprises fully shielded inductive detectors having a shield element that entirely surrounds one or more sensing electrodes. The ability of fully shielded inductive detectors of the present invention to detect and analyze the flight times of charged particles generated from biopolymers was evaluated. Use of fully shielded inductive detectors provides better sensitivity and more accurate timing resolution compared to partially shielded inductive detectors.

Figure 10:
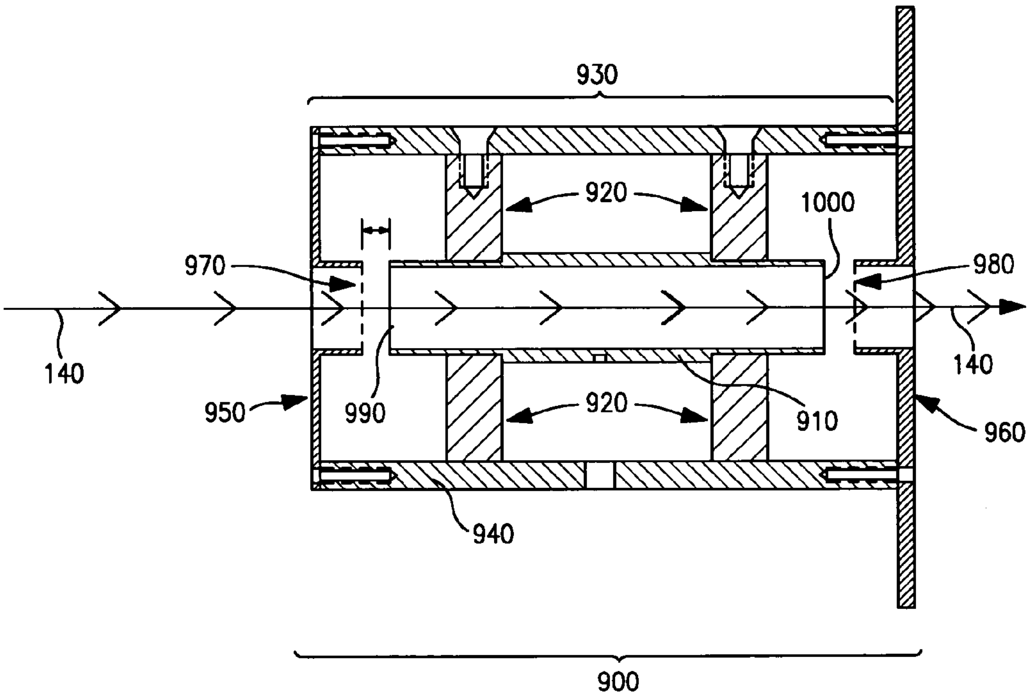
FIG. 10 is a schematic diagram illustrating an exemplary fully shielded inductive detector.

FIG. 10 is a schematic diagram illustrating an exemplary fully shielded inductive detector of the present invention. As shown in FIG. 10, fully shielded inductive detector (900) comprises a tubular sensing electrode (910) having an axial bore concentrically positioned about charge detection axis (140), an insulator (920) and a shielding element (930) having a axial bore concentrically positioned about charge detection axis. Sensing electrode (910) and insulator (920) are positioned within the axial bore of the shielding element. In an exemplary embodiment, shielding element (930) comprises tubular shielding body (940) concentrically positioned about charge detection axis (140) and operationally connected to first endplate (950), second endplate (960), first shielding grid (970) and second shielding grid (980). In the detector arrangement illustrated in FIG. 10, first shielding grid (970) and second shielding grid (980) are positioned so that they intersect charge detection axis (140) and are positioned selected distances from the first and second ends (990) and (1000) of sensing electrode (910). An exemplary trajectory of a charged particle or packet of charged particles is represented in FIG. 10 by arrows. In an alternative embodiment, shield element may comprise a shielding tube (940), a first grid (970) and a second grid (980) without endplates, wherein first grid (970) and second grid (980) are positioned to extend across the entire ends of shielding tube (940).

Exemplary shielding elements of fully shielded inductive detectors of the present invention entirely surround one or more sensing electrode. In this context, the expression "entirely surrounds" means that the sensing electrode is surrounded on all sides by the shielding element. For example, in the exemplary embodiment shown in FIG. 10, the sensing electrode is entirely surrounded by the combination of shielding body (940), first or second endplates (950) and (960)) and first and second shielding grids (970) and (980). Charged particles are conduced through fully shielded inductive detectors by sequentially passing through first shielding grid, the axial bore of the sensing electrode and the second shielding grid.

Shielding body (940) may be any shape including, but not limited to, tubular, cylindrical, elliptic cylindrical, conical or any combination of these shapes. First shielding grid (970) and second shielding grid (980) may be any shape including, but not limited to, circular, rectangular, ellipsoidal, and triangular. In the exemplary embodiment shown in FIG. 10, shielding body (940) is cylindrical and first and second grids (970) and (980) are substantially circular. First and second shielding grids (970) and (980) may be positioned any distance along detection axis (140) from first and second ends (990) and (1000) of sensing electrode (910), preferably a distance having a value selected over the range of about 5 mm to about 0.5 mm from sensing electrode (910) and more preferably a value equal to about 2.5 mm. The present invention also comprises fully shielded inductive detectors wherein the position of first shielding element, second shielding element or both along the charge detection axis is selectably adjustable. Shielding grids (970) and (980) may comprise any porous element allowing for substantial ion transmission, preferably a transmission greater than or equal to about 80% of the incident ions and more preferably equal to about 90% of the incident ions. Exemplary shielding grids usable in the present invention are any elements or devices at least partially transmissive to charged particles including, but not limited to, grids, screens, plates having a plurality of orifices, lattices, or any combination of these elements. Exemplary shielding grids usable in the present invention may be comprised of any conducting or semiconducting materials including, but not limited to, metals, semiconductors, conducting or semiconducting polymeric materials, conducting or semiconducting nonmetals or any combinations of these.

In an exemplary embodiment, shield element (930) is held at an electric potential substantially close to ground. As a result of this electric bias, charge is not induced on the surface of sensing electrode (910) by a charged particle or packet of charged particles until they are transmitted through first shielding grid (970). After crossing grid (970), charge begins to develop on the surface of sensing electrode (910). The charged particle or the packet of charged particles continues to induce charge on the surface of the sensing electrode (910) until passing through second grid (980). In this configuration, the rise time corresponding to the induced charge is provide by the expression:

$$\text{rise time} = \left(\frac{X}{v}\right); \tag{VII}$$

wherein X is the distance between the first shielding grid (970) and the first end (990) of sensing electrode (910) and/or the distance between the second shielding grid (980) and the second end (1000) of sensing electrode (910) and v is the average velocity of the charge particle or packet of charged particles. As a result of the dependency shown in Equation VII, selection of smaller values of X results in shorter rise times for a constant velocity.

Use of shielding grids (970) and (980) in the present invention provides the ability to select rise times which provide enhanced time resolution. Equation VII shows the dependence of time resolution ($\sigma_{time}$) on the root mean square of noise on the signal ($\sigma_{noise}$) and the rise time (dV/dt):

$$\sigma_{time} = \frac{\sigma_{noise}}{\left|\frac{dV}{dt}\right|}. \tag{VIII}$$

As shown in Equation VIII, use of short rises times may provide TOF analysis with enhanced time resolution.

Figures 11A, 11B, 11C:
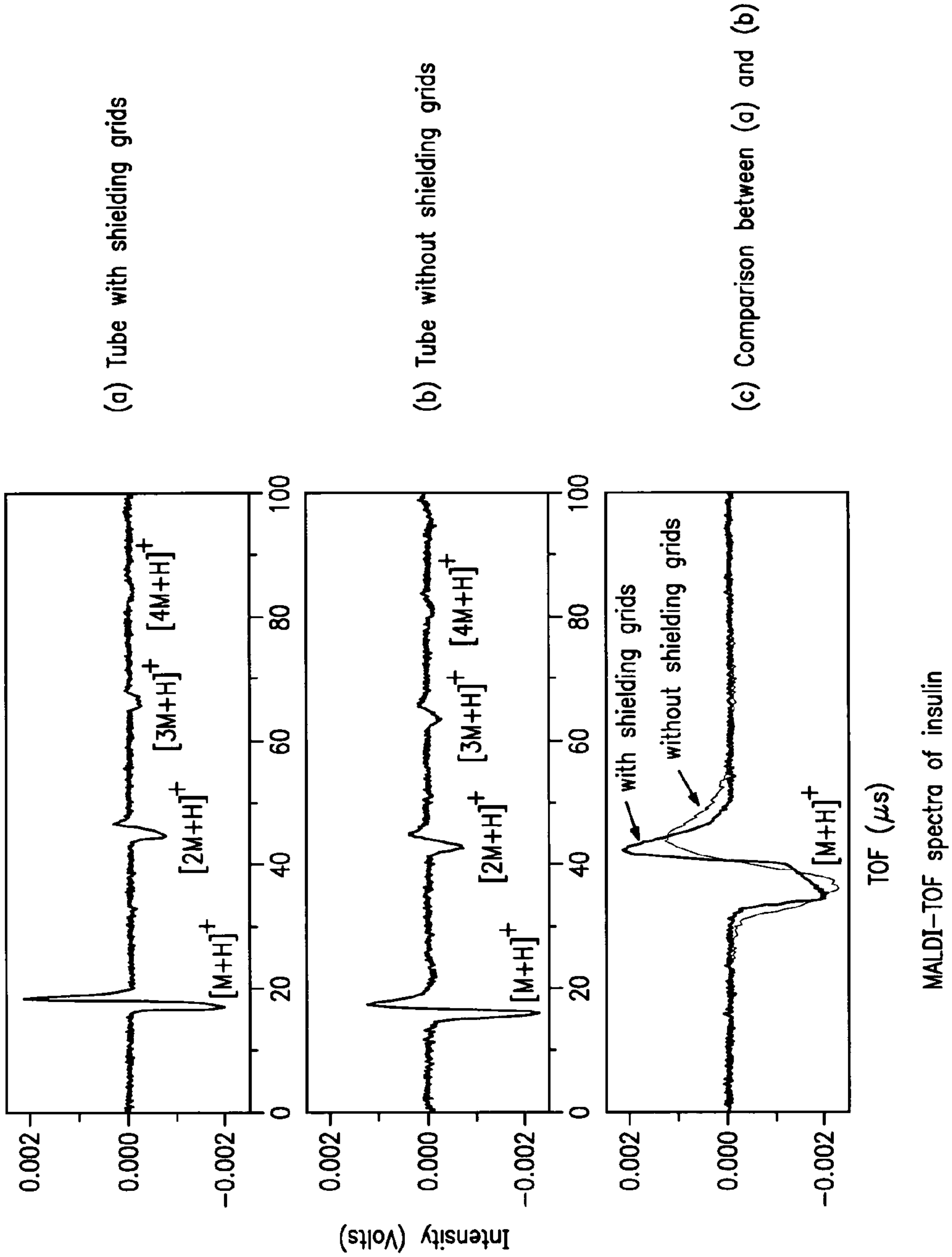
FIGS. 11A–C show time-of-flight spectra acquired for an exemplary fully shielded inductive detector.

FIGS. 11A–C show time-of-flight spectra acquired for an exemplary fully shielded inductive detector of the present invention. FIG. 1A shows a spectrum observed with shielding grids (970) and (980) in place (as shown in FIG. 10). FIG. 11B shows a spectrum observed with shielding grids (970) and (980) withdrawn. For the sake of comparison, FIG. 11C shows both spectra shown in FIGS. 11A and 11B.

Use of fully shielded inductive detectors having first and second shielding grids has several advantages over partially shielded inductive detector geometries. First, as shown in FIGS. 11A–C, use of shielding grids provides substantially flatter baseline signals. This reduction in observed baseline variation provides for increased signal-to-noise ratio and, thus, enhanced detection sensitivity. Second, use of shield elements having shielding grids provides substantially more rapid transitions from baseline to peak and peak to baseline. As predicted by Equation VIII, more rapid rise times are expected to improve detector time resolution, which may also correspond to enhanced mass resolution for time-of-flight measurements made in an evacuated flight tube. Third, in the context of ion detection in coincidence, the improved sharpness of peaks is also expected to increase the resolution of the measurement of flight times between two fully shield inductive detectors because start times and end times may be determined with greater accuracy.

EXAMPLE 4

MALDI Flight Tube Detector

Figure 12:
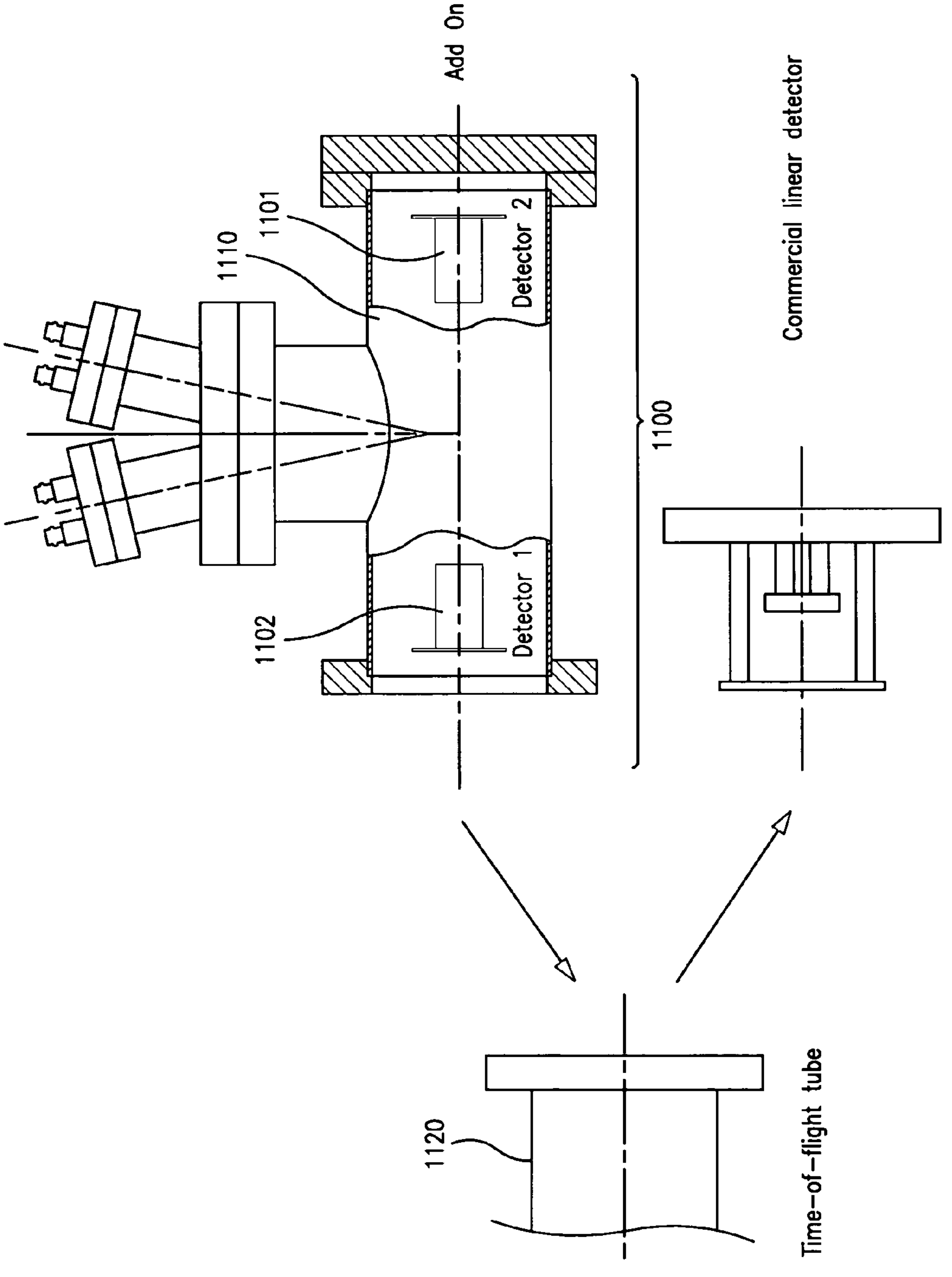
FIG. 12 is a schematic diagram of an exemplary inductive detector of the present invention well-suited for incorporation into conventional mass spectrometers utilizing time-of-flight detection.

The inductive detection systems of the present invention are high versatile and may be adapted to provide ion detection in coincidence for a wide range of commercial instruments, including MADLI ion sources and mass spectrometers, ESI ion sources and mass spectrometers, tandem mass spectrometers, TOF-TOF instruments, single quadrupole mass spectrometers, triple quadrupole mass spectrometers, linear ion traps, quadrupole—time-of-flight mass spectrometers and Fourier transform ion cyclotron resonance mass spectrometers. FIG. 12 is a schematic diagram of an exemplary inductive detector of the present invention well-suited for incorporation into conventional mass spectrometers utilizing time-of-flight detection. The exemplary detector (1100) comprises first and second inductive detectors (1101) and (1102), preferentially fully shielded inductive detectors, which are housed in housing (1110). In a preferred embodiment, housing (1110) is designed such that it can be easily mounted and aligned to flight tube (1120) of a time-of-flight mass spectrometer. Any mounting system capable of attaching inductive detector (1110) to the end of a flight tube is useable in the present invention including the use of clamps, flanges, compression fittings, o-ring seals, gaskets, screws, weld seals and all equivalents known in the art. Exemplary detector (1100) provides an inexpensive detector providing tandem, on axis inductive detection which may be easily incorporated into any device having a time-of-flight tube.

We claim:

1. A fully shielded inductive detector for detecting charged particles comprising:

a sensing electrode having a first axial bore concentrically positioned about a detection axis, wherein the sensing electrode has an external end and an internal end; and a shielding element having a second axial bore concentrically positioned about the detection axis, wherein said shielding element is positioned such that said sensing electrode is within said second axial bore and wherein said shielding element entirely surrounds said sensing electrode;

said shielding element comprising:

a tubular shielding body having said second axial bore, a first end and a second end;

a first shielding grid positioned to intersect said detection axis and operationally connected to said first end of said shielding body, and a second shielding grid positioned to intersect said detection axis and operationally connected to said second end of said shielding body.

2. The detector of claim 1 further comprising an insulator positioned between said sensing electrode and said tubular shielding body.

3. The detector of claim 1 wherein said shielding element further comprises a first endplate operationally connected to said first end and a second endplate operationally connected to said second end.

4. The detector of claim 1 wherein said shielding element is held at an electric potential substantially close to ground.

5. The detector of claim 1 wherein said first shielding grid is positioned a distance from said internal end of said sensing electrode selected from the range of values equal to about 5 mm to about 0.5 mm and said second shielding grid is positioned a distance from said external end of said sensing electrode selected from the range of values equal to about 5 mm to about 0.5 mm.

6. The detector of claim 5, wherein said first shielding grid is positioned 2.5 mm from said internal end of said sensing electrode and said second shielding grid is positioned 2.5 mm from said external end of said sensing electrode.

7. The detector of claim 1, wherein said shielding element comprises a cylindrical, elliptic or conical shielding body.

8. The detector of claim 1 wherein said sensing electrode is surrounded on all sides by said shielding element.

9. The detector of claim 1 wherein said first shielding grid is positioned to entirely extend across said first end of said shielding body and wherein said second shielding grid is positioned to entirely extend across said second end of said shielding body.

10. The detector of claim 1 wherein said first shielding grid is positioned a distance from said internal end of said sensing electrode that is selectably adjustable and said second shielding grid is positioned a distance from said external end of said sensing electrode that is selectably adjustable.

11. The detector of claim 1 wherein said first shielding grid, said second shielding grid or both transmits greater than about 80% of incident ions.

12. The detector of claim 1 wherein said first shielding grid, said second shielding grid or both comprise a screen, a plate having a plurality of orifices or a lattice.

13. The detector of claim 1 wherein said shielding body, first shielding grid and said second shielding grid is held at an electric potential close to ground.

14. The detector of claim 1 comprising a detector for a time-of-flight mass analyzer.

15. The detector of claim 1 wherein said sensing electrode and said shielding element are not in electrical contact.

16. The detector of claim 1 wherein said charged particles pass along said detection axis through said first shield grid, the axial bore of said sensing electrode and said second shield grid.

* * * * *